United States Patent
Wu et al.

(10) Patent No.: US 10,114,126 B2
(45) Date of Patent: Oct. 30, 2018

(54) SENSOR INSTALLATION MONITORING

(71) Applicant: Raytheon Company, Waltham, MA (US)

(72) Inventors: Shuwu Wu, Yorba Linda, CA (US); Ji Li, Broomfield, CO (US); Tyler Thomas, Fullerton, CA (US); Howard E. Wan, Diamond Bar, CA (US)

(73) Assignee: Raytheon Company, Waltham, MA (US)

( * ) Notice: Subject to any disclaimer, the term of this patent is extended or adjusted under 35 U.S.C. 154(b) by 211 days.

(21) Appl. No.: 14/701,300

(22) Filed: Apr. 30, 2015

(65) Prior Publication Data

US 2016/0320493 A1 Nov. 3, 2016

(51) Int. Cl.
*G01S 19/44* (2010.01)
*G01S 19/41* (2010.01)
(Continued)

(52) U.S. Cl.
CPC ............. *G01S 19/44* (2013.01); *G01S 19/41* (2013.01); *G01S 19/49* (2013.01); *G01S 19/51* (2013.01); *G01S 19/54* (2013.01); *G01S 19/55* (2013.01)

(58) Field of Classification Search
CPC ......... B64B 1/02; F41G 7/346; G01S 5/0045; G01S 19/15; G01S 19/55; G01S 19/04; G01S 19/53; G01S 19/215; G01S 19/44; G01S 5/0027; G01S 3/46; G01S 19/54; G01S 19/49; G01S 19/41; G01S 19/51; G01S 19/43; G01S 19/48; G01C 21/165; G01C 15/00; G05D 1/0259
(Continued)

(56) References Cited

U.S. PATENT DOCUMENTS 5,471,218 A * 11/1995 Talbot et al. ........... G01S 19/43
5,543,804 A 8/1996 Buehler et al.
(Continued)

FOREIGN PATENT DOCUMENTS

EP  1729145 A1  12/2006
EP  2068165 A2  6/2009
(Continued)

OTHER PUBLICATIONS

Entry for the Word, "Baseline" at yourdictionary.com. Accessed on Nov. 20, 2017.*
(Continued)

*Primary Examiner* — Bernarr E Gregory

(57) ABSTRACT

Technology for surveying sensor locations on a physical platform is described. An estimated baseline vector can be calculated between a temporary navigation sensor and each fixed navigation sensor in a group of fixed navigation sensors. The temporary navigation sensor can be temporarily placed on the physical platform. The fixed navigation sensors can be installed on the physical platform. A refined baseline vector between the temporary navigation sensor and each fixed navigation sensor can be successively calculated by fixing carrier phase integer ambiguities that are variables used in the estimation of the baseline vector. A final survey distance between the temporary navigation sensor and each of the fixed navigation sensors can be generated using the refined baseline vector.

38 Claims, 22 Drawing Sheets

(51) Int. Cl.
*G01S 19/51* (2010.01)
*G01S 19/49* (2010.01)
*G01S 19/55* (2010.01)
*G01S 19/54* (2010.01)
*G01S 19/00* (2010.01)

(58) Field of Classification Search
USPC .................................................... 342/357.24
See application file for complete search history.

(56) References Cited

U.S. PATENT DOCUMENTS

| | | | |
|---|---|---|---|
| 5,548,293 | A | 8/1996 | Cohen |
| 5,554,994 | A * | 9/1996 | Schneider ............... F41G 7/346 244/3.19 |
| 5,561,432 | A | 10/1996 | Knight |
| 5,702,070 | A * | 12/1997 | Waid ..................... G01S 5/0045 244/183 |
| 5,916,300 | A | 6/1999 | Kirk et al. |
| 5,929,807 | A | 7/1999 | Viney et al. |
| 5,933,110 | A | 8/1999 | Tang et al. |
| 5,936,573 | A | 8/1999 | Smith |
| 5,991,691 | A * | 11/1999 | Johnson .................. G01S 19/15 342/357.27 |
| 6,061,631 | A * | 5/2000 | Zhang ..................... G01S 19/55 342/350 |
| 6,088,653 | A | 7/2000 | Sheikh et al. |
| 6,157,891 | A | 12/2000 | Lin |
| 6,204,806 | B1 | 3/2001 | Hoech |
| 6,208,239 | B1 | 3/2001 | Muller et al. |
| 6,281,836 | B1 | 8/2001 | Lupash et al. |
| 6,369,755 | B1 * | 4/2002 | Nichols et al. ......... G01S 19/44 |
| 6,424,915 | B1 | 7/2002 | Fukuda et al. |
| 6,466,846 | B2 | 10/2002 | Maynard |
| 6,480,789 | B2 | 11/2002 | Lin |
| 6,675,095 | B1 | 1/2004 | Bird et al. |
| 6,697,736 | B2 | 2/2004 | Lin |
| 6,727,849 | B1 * | 4/2004 | Kirk et al. ............... G01S 19/44 |
| 6,732,051 | B1 * | 5/2004 | Kirk et al. ............... G01S 19/48 |
| 6,753,810 | B1 | 6/2004 | Yang et al. |
| 6,792,380 | B2 | 9/2004 | Toda |
| 6,816,117 | B2 * | 11/2004 | Fink et al. ............... G01S 19/55 |
| 6,847,893 | B1 | 1/2005 | Lupash |
| 6,856,905 | B2 | 2/2005 | Pashuel et al. |
| 6,970,785 | B2 | 11/2005 | Derambure et al. |
| 7,205,939 | B2 | 4/2007 | Zimmerman |
| 7,219,013 | B1 | 5/2007 | Young et al. |
| 7,292,185 | B2 | 11/2007 | Whitehead et al. |
| 7,310,062 | B1 * | 12/2007 | Hwang ................. G01S 19/215 342/357.59 |
| 7,355,549 | B2 | 4/2008 | Fukuda et al. |
| 7,411,545 | B2 | 8/2008 | Dutton |
| 7,436,354 | B2 | 10/2008 | Lee |
| 7,460,065 | B2 | 12/2008 | Ogawa et al. |
| 7,711,482 | B2 | 5/2010 | Coatantiec et al. |
| 7,768,451 | B2 | 8/2010 | Wu et al. |
| 7,855,678 | B2 | 12/2010 | Scherzinger et al. |
| 7,868,820 | B2 | 1/2011 | Kolb |
| 7,987,049 | B2 | 7/2011 | Hayashi et al. |
| 8,019,539 | B2 | 9/2011 | Vanderwerf |
| 8,271,194 | B2 * | 9/2012 | Whitehead ............. G01C 15/00 342/357.26 |
| 8,570,217 | B2 | 10/2013 | Oehler |
| 8,610,623 | B2 | 12/2013 | Trautenberg |
| 8,779,967 | B2 * | 7/2014 | Jones ..................... G01C 15/00 342/22 |
| 8,898,011 | B2 | 11/2014 | Peck et al. |
| 8,949,011 | B2 * | 2/2015 | Ford ..................... G01C 21/165 342/33 |
| 9,173,337 | B2 | 11/2015 | Guyette et al. |
| 2003/0112177 | A1 | 6/2003 | Toda et al. |
| 2003/0117317 | A1 | 6/2003 | Vanderwerf et al. |
| 2003/0154049 | A1 * | 8/2003 | Toda ........................ G01S 19/55 702/151 |
| 2005/0012660 | A1 * | 1/2005 | Nielsen ................... G01S 19/04 342/357.31 |
| 2006/0114157 | A1 * | 6/2006 | Kolanek ................... G01S 3/46 342/424 |
| 2007/0075896 | A1 * | 4/2007 | Whitehead .............. G01S 19/53 342/357.36 |
| 2008/0084348 | A1 | 4/2008 | Vacher |
| 2008/0129586 | A1 | 6/2008 | Martin |
| 2008/0297408 | A1 | 12/2008 | Dai et al. |
| 2009/0027262 | A1 * | 1/2009 | Wu .......................... G01S 19/44 342/357.27 |
| 2009/0222204 | A1 * | 9/2009 | Roberts ................. G05D 1/0259 701/470 |
| 2009/0284258 | A1 * | 11/2009 | Morrison ................... B64B 1/02 324/330 |
| 2010/0278013 | A1 * | 11/2010 | Holmes ................. G01S 5/0027 367/129 |
| 2011/0181463 | A1 | 7/2011 | Chopard et al. |
| 2011/0291887 | A1 | 12/2011 | Pulford |
| 2013/0050020 | A1 | 2/2013 | Peck et al. |
| 2013/0069822 | A1 * | 3/2013 | Wu .......................... G01S 19/55 342/357.24 |
| 2014/0197988 | A1 | 7/2014 | Teunissen et al. |

FOREIGN PATENT DOCUMENTS

| | | | |
|---|---|---|---|
| EP | 2244097 A1 | 10/2010 | |
| WO | WO 2004/031797 A1 | 4/2004 | |

OTHER PUBLICATIONS

Entry for the Word, "Vector" at yourdictionary.com. Accessed on Nov. 20, 2017.*
Wikipedia Article, "Baseline (Surveying)"; Accessed on Nov. 20, 2017.*
Enge et al., Local Area Augmentation of GPS for the Precision Approach of Aircraft, Jan. 1999, pp. 111-132, vol. 87, No. 1, IEEE, United States of America.
Giorgi et al., Enhancing the Time-To-Fix for the Unaided Single-Frequency Integer Ambiguity Resolution in GNSS Attitude Determination Applications, May 4, 2010, pp. 236-244, IEEE, United States of America.
Henkel et al., Integrity Analysis of Cascaded Integer Resolution with Decorrelation Transformations, Proceedings of the 2007 National Technical Meeting of the ION, Jan. 22-24, 2007, pp. 903-910, San Diego, California.
Kalman, A New Approach to Linear Filtering and Prediction Problems, Transaction of the ASME-Journal of Basic Engineering, Mar. 1960, pp. 35-45.
Khanafseh et al., A New Approach for Calculating Position Domain Integrity Risk for Cycle Resolution in Carrier Phase Navigation Systems, Oct. 2008, 11 pages, IEEE, United States of America.
Khanafseh et al., H1-Integrity of Carrier Phase Navigation Algorithms Using Multiple Reference Receivers, Proceedings of the National Technical Meeting—Institute of Navigation, 2009, 12 pages.
Lee, A New Improved RAIM Method Based on the Optimally Weighted Average Solution (OWAS) Under the Assumption of a Single Fault, Proc. of the ION National Technical Meeting, Jan. 19, 2006, 13 pages.
McGraw, Generalized Divergence-Free Carrier Smoothing with Applications to Dual Frequency Differential GPS, ION Nat. Tech. Meeting, Jan. 18-20, 2006, 8 pages, Monterey, California.
Misra et al., Global Positioning System: Signals, Measurements, and Performance, 2006, 2$^{nd}$ edition, Ganga-Jamuna Press.
Rife et al., Core Overbounding and its Implications for LAAS Integrity, 17$^{th}$ International Technical Meeting of the Satellite Division ION GNSS, Sep. 2004, 12 pages.
Sayim et at, Overbouncling Non-zero Mean Gaussian Ranging Error for Navigation Integrity of LAAS, Proceedings of 2$^{nd}$ International Conference on Recent Advances in Space Technologies, Jun. 9-11, 2005, pp. 404-410, IEEE, United States of America.

(56) References Cited

OTHER PUBLICATIONS

Teunissen, GNSS Ambiguity Bootstrapping: Theory and Application, Int. Symposium on Kinematic Systems in Geodesy, Geomatics, and Navigation, Jun. 5-8, 2001, pp. 246-254, Canada.
Teunissen, Statistical GNSS Carrier Phase Ambiguity Resolution: A Review, 2001, 9 pages, IEEE, United States of America.
Teunissen, The least-squares ambiguity decorrelation adjustment: a method for fast GPS integer ambiguity estimation, Journal of Geodesy, 1995, pp. 65-82, vol. 70, Springer-Verlag, Germany.
Teunissen et al., A Probabilistic Evaluation of Correct GPS Ambiguity Resolution, Proc. of the $11^{th}$ Int. Tech. Meeting of the Satellite Div. of the Institute of Navigation, Sep. 15-18, 1998, pp. 1315-1323, Nashville, Tennessee.
Walter et al., Weighted RAIM for Precision Approach, Proceedings of the ION GPS, 1995, 10 pages.
Wang et al, A motion-based integer ambiguity resolution method for attitude determination using the global positioning system (GPS), Measurement Science and Technology, Apr. 28, 2010, 9 pages, vol. 21, IOP Publishing, United Kingdom.
Wu et al., Differential GPS-Based Ultra-High Accuracy Real Time Attitude Determination, 2010, 17 pages.
Wu et al., Geometry Extra-Redundant Almost Fixed Solutions: A High Integrity Approach for Carrier Phase Ambiguity Resolution for High Accuracy Relative Navigation, May 2008, 15 pages, IEEE, United States of America.
EP Search Report for EP Application No. 12184868.3, dated Feb. 20, 2013, 9 pages.
International Search Report for International Application No. PCT/US2013/050090 dated Oct. 4, 2013, 12 pages.

\* cited by examiner

SENSOR INSTALLATION MONITORING

GOVERNMENT LICENSE RIGHTS

This invention was made with government support under Contract No. N00019-08-C-0034 awarded by United States Navy. The government has certain rights in the invention.

BACKGROUND

Precision navigation systems can be used for aircraft landing systems, such as landing aircraft on a moving platform, Local Area Augmentation System (LAAS) or Ground Based Augmentation System (GBAS). A precision aircraft landing system is a navigation aid that can assist aircraft in landing in a wide range of environments. For example, the aircraft landing system can guide the aircraft to a landing platform onboard a ship or to a makeshift airfield. The aircraft landing system can provide real-time differential correction of GPS signals to aid the aircraft in landing on the landing platform. Differential GPS can provide improved location accuracy, such as from the 15-meter nominal GPS accuracy to approximately 10 centimeters (cm). Local reference receivers, such as global positioning system (GPS) sensors can be installed on the landing platform. The landing platform can be at an airport or onboard an aircraft carrier. The local reference receivers can be located around the landing platform at precisely surveyed locations.

In one example, the aircraft landing system can include at least three local reference receivers (e.g., GPS sensors or GPS receivers), a central processing system, and a transmitter, such as a very high frequency (VHF) data broadcast (VDB) transmitter. The local reference receivers can receive GPS signals from a plurality of GPS satellites. Each local reference receiver can measure a time of transmission between a GPS satellite and the local reference receiver and a travel distance of the GPS signal. The aircraft landing system can compare the measured distance with an actual distance based on a broadcast satellite position and a true local reference receiver position. A correction value can be determined based on a difference between the measured distance and the actual distance. The correction value can be used to formulate a correction message, which can be transmitted to a receiver onboard the aircraft via the VDB transmitter. The receiver onboard the aircraft can use the correction message to more accurate compute the aircraft's GPS position, velocity and time to guide the aircraft safety to the landing platform.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
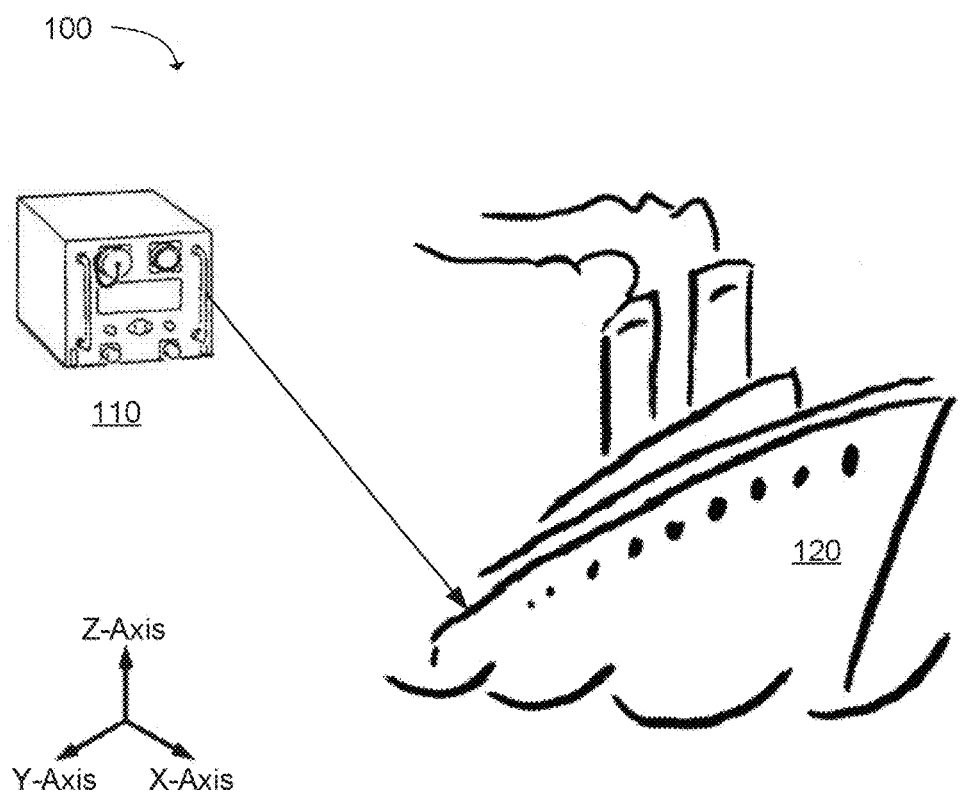
FIG. 1 illustrates a moving platform (e.g., a ship) with an inertial measurement unit (IMU) in relation to a three dimensional coordinate system in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Traditional precision navigation systems can provide vital services for military and civilian usage. For example, traditional precision navigation systems can be used in aircraft landing systems, such as landing aircraft on a moving platform, Local Area Augmentation System (LAAS) or Ground Based Augmentation System (GBAS). These systems can assist an aircraft in landing onto a landing platform. For example, the aircraft can receive differential global positioning system (GPS) information from an aircraft landing system, and then use the differential GPS information to more accurate compute the aircraft's GPS position, velocity and time to guide the aircraft safety to the landing platform. The landing platform can be onboard a moving platform, such as an aircraft carrier or another type of ship. Alternatively, the landing platform can be on ground (e.g., at an airfield). Performance standards for the aircraft landing systems are becoming increasingly stringent. In one example, landing aircraft on a moving platform is considered a high integrity system when the likelihood of a faulty navigation solution is less than $1 \times 10^{-7}$.

A challenge in traditional precision navigation systems is the sensor installation. The sensors can include GPS sensors/antennas, inertial measurement unit (IMU) sensors or other types of navigation sensors. The navigation sensors can be installed around the landing platform. The GPS sensors can receive GPS signals from a plurality of GPS satellites. The aircraft landing system can compare a measured distance between a GPS satellite and a navigation sensor with an actual distance between the GPS satellite and the navigation sensor based on a broadcast satellite position and a true position of the navigation sensor. The initial position estimate of the navigation sensor can be based on a previous survey of the navigation sensor. For example, the survey can be performed during an installation of the navigation sensor. A difference between the measured distance and the actual distance can be provided to the aircraft, and the aircraft can use this information to correct GPS signals received at the aircraft. Thus, the navigation sensors on the landing platform can provide high integrity navigation services for the aircraft. High integrity assurance will minimize the likelihood, to a specified threshold, of a faulty angular misalignment, survey, flexure result and/or navigation solution.

When installed on the moving platform (e.g., the aircraft carrier), the precision navigations sensor location and IMU orientation is to be accurately surveyed and aligned to ensure that navigation sensor measurements correctly reflect a motion of the moving platform. Therefore, an incorrect survey during the navigation sensor installation can prevent the precision navigation system from meeting various performance criteria. In addition, providing incorrect navigation information to the aircraft (e.g., due to misaligned navigation sensors) can cause a hazard to the aircraft.

Traditional techniques for determining navigation sensor locations can include a manual surveying process for each navigation sensor. Existing survey techniques can be time consuming and costly. There are a number of drawbacks in traditional precision navigation systems. For example, a first drawback is that performing angular alignment of the IMUs to a standard tolerance (e.g., 0.002 degrees) is inherently difficult and the traditional techniques often cannot meet the stringent installation specifications for the precision navigation system. Traditional solutions to meet angular alignment surveying standards can be time consuming, labor intensive, expensive and iterative. In addition, these techniques can involve performing an offline process by a maintainer who possesses expert knowledge in the precision navigation system.

A second drawback in traditional precision navigation systems is that manual survey of navigation sensors in the precision navigation system is a time consuming process. There are certain time critical applications where a fast, self-survey technique would greatly enhance current capabilities. Rapid deployment of a mobile navigation system in a battlefield or disaster relief situation is currently limited by the time it takes to manually survey the proposed airfield. A relatively fast (less than 1 hour) self-surveying system could allow users (e.g., military and civil emergency teams) to rapidly deploy a precision navigation system for support aircraft.

A third drawback in traditional precision navigation systems is that navigation sensor locations on a moving platform relative to its initial survey reference point can change over time due to temperature variation and wear and tear of the moving platform. Therefore, the initial survey of each navigation sensor may no longer be accurate over an extended period of time. For high integrity precision navigation systems, such as landing aircraft on a moving platform, the survey measurements are to be accurate and up-to-date. There is no existing practice to verify survey accuracy after the initial installation of the navigation sensors other than to perform the costly, manual survey at regular intervals.

A fourth drawback in traditional precision navigation systems is that navigation sensors can move from their default position over a short amount of time. For example, the navigation sensors can move due to structure flexing on the moving platform. For a high integrity and accuracy navigation system, a small amount of flexing can lead to sensor position errors that are larger than the survey requirements. In this scenario, the navigation sensor location can be monitored in real-time to mitigate the survey error caused by the flexing. However, no existing techniques provide an ability to monitor survey errors caused by flexure on the scale necessary for precision navigation systems.

As described herein, a novel real-time sensor installation monitor (RSIM) algorithm can mitigate the drawbacks described above, as well as others not specifically identified herein. The RSIM can utilize a high integrity attitude source of three rotational angles (roll/pitch/yaw) in real time with ultra-high accuracy. In one example, the attitude source can be a Real Time Attitude Determination (RTAD) system. RTAD is a differential GPS processing technology that can provide ultra-high angular accuracy with high integrity. RTAD can use multiple installed navigation sensors (e.g., GPS sensors) on the moving platform to effectively determine and monitor sensor locations and orientations to within 1 cm and about 0.0015 degrees. Another important benefit is that the RSIM can produce results having high integrity assurance, which is needed for safety-critical applications. High integrity assurance can result when a likelihood of a faulty angular misalignment, survey, flexure result and/or navigation solution is less than $1 \times 10^{-7}$.

The novel RSIM mitigation solution can include separate algorithms, for example, algorithms that correspond to each of the different drawbacks discussed above. Although each of these algorithms are described in greater detail below, a brief description of each algorithm is provided as follows:

With respect to the first drawback described above, the RSIM can provide an automatic angular alignment technique that meets a stringent angular tolerance and provides high integrity assurance (e.g., 99.99999%) of the alignment. Although it is a difficult task to boresight (or angularly align) an installed inertial measurement unit (IMU) to a very precise tolerance, the RSIM can leverage highly accurate differential GPS processing techniques to boresight the IMU to a tolerance that is approximately 30 times more accurate than that of conventional GPS/inertial solutions.

Since the attitude source (e.g., RTAD) can produce very accurate angular information (roll, pitch and yaw), the RSIM uses this RTAD result as a truth attitude source to perform data averaging, apply boresight values to the IMU, and verify post-boresight GPS/inertial results using a preset tolerance. The process can repeat if necessary to reach a desired stringent boresight tolerance. The entire process is performed automatically without human intervention and can replace existing manual and time consuming processes, which can achieve less accurate results without high integrity assurance.

With respect to the second drawback described above, the RSIM can provide self-surveying capability by taking a rough survey estimate and iterating with ultra-accurate differential GPS measurements to converge on baseline vectors between navigation sensors (e.g., GPS sensors), which can result in a sub-centimeter sensor installation survey. Conventional survey techniques can take too much time to rapidly deploy a mobile precision navigation system. By computing a rough estimated survey dataset or using existing survey information, the RSIM can provide a relatively fast and precise navigation sensor self-survey capability. By initially performing a rough survey determination through differential GPS calculation and computing precision baseline information, a relatively fast converging iterative process can be used to reach a final precise survey within 1 cm, hence providing a fast, automatic navigation sensor self-survey, aids in setting up a mobile precision navigation system in a reduced amount of time.

With respect to the third drawback described above, the RSIM can monitor navigation sensor installation locations by providing sub-centimeter measurements of baseline vectors between navigation sensors and comparing them to survey information. The RTAD can solve for the three rotational angles and simultaneously resolve carrier phase integer ambiguity with high integrity. With the resolved integer ambiguities, the three dimensional (3D) baseline vector between a pair of navigation sensors can be accurately (i.e., to within 1 cm) determined. The 3D baseline vector can be compared with the existing survey for consistency and/or the survey can be updated accordingly. For precision navigation applications, GPS antenna locations are surveyed post-installation. However, it is desirable to periodically verify the validity of existing survey results. Therefore, the RSIM can leverage highly accurate differential GPS processing techniques to verify and re-determine, if necessary, the survey to within 1 cm.

With respect to the fourth drawback described above, the RSIM can monitor and mitigate survey errors caused by flexure in the moving platform by monitoring baseline vectors over relatively small sample periods. When navigation sensors are installed on moving platforms, it is vital to monitor relative flexure between each pair of navigation sensors. A difference between a precise 3D baseline vector (e.g., between a pair of navigation sensors) and the known survey results over a period of time can be computed in order to monitor the dynamic flexure of the moving platform in real time. Thus, the RSIM can leverage highly accurate differential GPS processing techniques to monitor flexure with 1 cm accuracy.

The novel RSIM described herein can perform appropriate signal processing to recursively and automatically reach ultra-high accuracy boresight while utilizing RTAD's results as high accuracy attitude source. The novel RSIM described herein can leverage RTAD's resolved carrier phase integer ambiguity and solve for the 3D baseline vector for any pair of navigation sensors with high integrity. As a result, the amount of time and labor in navigation sensor installations can be reduced.

RSIM can be applicable for military use, non-military civilian or commercial use, domestic use and/or international use. RSIM can be used for surveying and verifying the installation of differential GPS-based landing systems that operate on moving aircraft runways (e.g., foreign/domestic aircraft carriers or large surface ship-based landing systems). RSIM can be used for surveying and verifying the installation of deployable or mobile GPS-based air traffic control systems, while also reducing a survey time and cost. RSIM can be used for surveying and verifying the installation of an inertial navigation system on an unmanned aerial vehicle (UAV), while allowing for automated UAV operations on the ground (e.g., parking, taxiing, autonomous refueling) and/or in the air. RSIM can be used for surveying and verifying the installation of an inertial navigation system on an unmanned ground vehicle, such as a self-driven car. RSIM can be used for precision inertial alignment of ballistic missiles. RSIM can be used for ship-based weapon systems that utilize attitude measurements of ultra-high accuracy. In addition, RSIM can be used for automatic self-survey to support rapid deployment of a mobile precision navigation system in a battle field or in a civil emergency deployment situation (e.g., disaster relief operations). RSIM can also be used to precisely survey structures and monitor flexure in structures, such as bridges, with respect to civil surveying.

Therefore, a first algorithm relates to angular misalignment of navigation sensors to moving platforms, a second algorithm relates to a self-survey of a sensor installation, a third algorithm relates to a verification of existing sensor surveys, and a fourth algorithm relates to monitoring of structure flexure. As described below, each of the described algorithms build off of modern high intensity relative positioning techniques.

Relative GPS Positioning

The algorithms briefly explained above utilize modern high integrity relative positioning techniques. A relative positioning concept used for RSIM is the use of Carrier Phase (CP) measurements for relative positioning. The mathematical background for high integrity CP relative positioning is described below. In one example, there is a reference (R) and an airborne or rover (A) GPS receiver, each simultaneously tracking the same n GPS satellites. A GPS observable, $O_i$ is defined for the $i^{th}$ GPS satellite, i=1, . . . , n, which can be a raw or smoothed L1/L2 Pseudorange (PR), an L1/L2 carrier phase, or any linear combinations thereof, such as a wide lane (WL) carrier phase or a narrow lane (NL) code.

The single differenced (SD) observables between the airborne and reference are defined as: $SD_{Oi}=O_i^A-O_i^R$. To form double differenced (DD) observables, i=1 can be chosen as the reference satellite (e.g., a highest elevation satellite). The double differenced observables are formed from single difference observables. The double difference observables are defined as: $DD_{Oi}=SD_{Oi}-SD_{O1}$, and there are n−1 such observables. The main advantage of using the double differenced observables is that both the receiver and satellite clock biases along with other common-mode signal-in-space errors drop out from the observation equations. High integrity integer ambiguity resolution is another element of a baseline vector calculation. The calculations start with the previously computed double difference observations.

There are multiple types of double difference observations that can be used. The types of double difference observations include, but are not limited to, Wide-Lane (WL), L1, L2, Narrow-Lane (NL), etc. In one configuration, the DD L1 CP and the DD NL PR can be used as the observations. This combination of measurements is commonly used in high integrity relative positioning; typically the NL PR measurements are smoothed with the L1 CP measurements using divergence-free smoothing techniques. The L1 and NL notation is used in the following examples, but can be generalized for any wavelength or wavelength combination. For a short baseline (e.g., less than 300 m) where residual atmospheric errors can be neglected, a linearized set of positioning equations is given by:

$$\underbrace{\begin{pmatrix}\varphi_{L1}\\\rho_{NL}\end{pmatrix}}_{y}=\underbrace{\begin{pmatrix}G & A\\G & 0\end{pmatrix}}_{H}\underbrace{\begin{pmatrix}\delta x\\N_{L1}\end{pmatrix}}_{X}+\varepsilon,$$

wherein $\Phi_{L1}$ is the vector of DD L1 CP measurements, $\rho_{NL}$ is the vector of DD NL code measurements, G is the differenced line of sight (LOS) geometry matrix, $\delta x$ is the error in the baseline vector between the airborne/rover user and the reference receiver, $N_{L1}$ is the vector of L1 ambiguities, $A=\lambda_{L1}I$, with $\lambda_{L1}$ the L1 wavelength, I the identity matrix, and $\varepsilon$ is the DD measurement error. In the equation above, the system can comprise of 2(n−1) DD measurements (CP and PR) and n+2 unknowns. Therefore, a solution exists whenever n≥4, with the geometric redundancy of n−4. In one example, the covariance is defined as:

$$\mathrm{cov}(\varepsilon)=\Sigma=\begin{pmatrix}\Sigma_{L1} & \Sigma_{LN}\\\Sigma_{LN}^T & \Sigma_{NL}\end{pmatrix}.$$

In some applications, multiple reference GPS receivers can be employed to both improve continuity of service and provide cross-thread integrity monitoring. Reference receiver measurements can be translated to a single reference point so they can be compared for integrity monitoring purposes. Additional geometric redundancy can be introduced when incorporating two or more complete sets of reference GPS measurements, which are combined with the rover GPS measurements to solve for a single baseline vector in one set of system of equations. When two sets of reference GPS measurements are used, the double difference system equations become:

$$\underbrace{\begin{pmatrix}\varphi_{L1}^1\\\rho_{NL}^1\\\varphi_{L1}^2\\\rho_{NL}^2\end{pmatrix}}_{y}=\underbrace{\begin{pmatrix}G & A & 0\\G & 0 & 0\\G & 0 & A\\G & 0 & 0\end{pmatrix}}_{H}\underbrace{\begin{pmatrix}\delta x\\N_{L1}^1\\N_{L1}^2\end{pmatrix}}_{X}+\varepsilon,$$

wherein the superscripts 1 and 2 are the data set indices. In this example, the system can comprise 4n−4 equations and 2n+1 unknowns, which yields 2n−5 number of redundant equations. Comparing to the single reference receiver case described above that has a geometric redundancy given by n−4, the additional measurements can make up for the additional ambiguities. In one example, when n=8, the equation for when two sets of reference GPS measurements are used yields 11 redundant equations, which is 7 more than what is provided in the single reference case. This extra degree of measurement redundancy is termed "geometric extra-redundancy". The geometric extra-redundancy significantly improves both the Probability of a Correct Fix (PCF) and the Probability of Almost Fix (PAF), yielding improved availability, while maintaining high integrity, of almost fixed solutions One approach for CP ambiguity resolution is based on the Least-squares AMBiguity Decorrelation Adjustment (LAMBDA) algorithm. The first step is to compute a float solution by ignoring the integer constraints of CP ambiguities and performing a standard weighted least squares adjustment. The least squares method involves fitting a linear equation to a data set.

Consider an over-determined linear system with unknown coefficients, $\hat{X}$, and an observed data set, y: $y=HX+\varepsilon$. The linear least squares estimate for the unknown coefficients is given as: $\hat{X}=(H^TH)^{-1}H^Ty$. The weighted least squares method is preferred when a more robust calculation is desired. A weighting matrix can be used to give more and less weights to higher and lower confidence measurements from the data set, respectively. The weighting matrix used here is the inverse of the covariance matrix, $\Sigma^{-1}$.

The initial float solution is calculated using a standard weighted least squares solution, which is given by:

$$\hat{X}=(H^T\Sigma^{-1}H)^{-1}H^T\Sigma^{-1}y$$

The covariance associated with the float estimates is given by:

$$P = \begin{pmatrix} Q_{\hat{x}} & Q_{\hat{x}\hat{N}} \\ Q_{\hat{N}\hat{x}} & Q_{\hat{N}} \end{pmatrix} = (H^T \Sigma^{-1} H)^{-1}$$

The LAMBDA algorithm determines a integer transformation matrix, $Z \in \square^{n-1}$ with $\det(Z)=1$ that approximately diagonalizes $Q_{\hat{N}}$. The ambiguities and their associated variance-covariance are transformed as:

$$\hat{a} = Z^T \hat{N}_{L1} \text{ and } Q_{\hat{a}} = Z^T Q_{\hat{N}} Z.$$

The covariance matrix for the decorrelated ambiguities can be decomposed as:

$$Q_{\hat{a}} = LDL^T,$$

wherein L is lower triangular matrix with ones on the diagonal and $$D = \text{diag}\{\sigma_1^2, \sigma_{2|1}^2, \ldots, \sigma_{i|I}^2, \ldots, \sigma_{n-1|N-1}^2\}.$$

In this example, $\sigma_{i|I}^2$ is the variance of the $i^{th}$ least-squares ambiguity obtained through a conditioning on the previous $I=\{1, \ldots, i-1\}$ ambiguities. This transformation yields the bootstrapping ambiguity resolution technique, with the fixed integers given by:

$$\check{a}_1 = [\hat{a}_1]$$
$$\check{a}_2 = [\hat{a}_{2|1}] = [\hat{a}_2 - l_{21}(\hat{a}_1 - \check{a}_1)]$$
$$\vdots$$
$$\check{a}_i = [\hat{a}_{i|I}] = \left[\hat{a}_i - \sum_{j=1}^{i-1} l_{ij}(\hat{a}_{j|J} - \check{a}_j)\right], i = 1, \ldots, N-1,$$

wherein $I_{ij}$ is the i-j element of L and $[\hat{a}_{2|1}]$ is the integer rounding function.

The bootstrapping technique of resolving ambiguities is used to estimate the most likely set of integer ambiguities. The bootstrapping technique provides an analytical expression for computing probability of obtaining a particular (correct or incorrect) integer fix, which is in contrast to the integer least squares approach normally used with LAMBDA. The probability of bootstrapping method yielding a particular integer fix, z, is given by:

$$P(\check{a} = z) = \prod_{i=1}^{N-1} \left\{ \Phi\left(\frac{1 - 2l_i^T(\hat{a} - z)}{2\sigma_{i|I}}\right) + \Phi\left(\frac{1 + 2l_i^T(\hat{a} - z)}{2\sigma_{i|I}}\right) - 1 \right\},$$

$z \in \square^{n-1}$ with $$\Phi(x) = \frac{1}{\sqrt{2\pi}} \int_{-\infty}^{x} \exp\left\{-\frac{1}{2}v^2\right\} dv, \text{ and}$$

$$P(\check{a} = a) = \prod_{i=1}^{N-1} \left[2\Phi\left(\frac{1}{2\sigma_{i|I}}\right) - 1\right].$$

Here $l_i$ is the $i^{th}$ column vector of the unit lower triangular matrix $L^{-T}$ and a is the vector of true integer ambiguities. Therefore, the computation of the PAF is obtained by summing up the PCF and each of the probability of almost fixed solution.

The fixed CP ambiguities are determined as $\check{N}_{L1} = Z^{-T} \check{a}$. The fixed CP ambiguities can be used to determine high accuracy baseline vectors between GPS sensors or high accuracy attitude measurements.

Angular Alignment of Navigation Sensors to Moving Platform

FIG. 1 illustrates an inertial measurement unit (IMU) 110 installed on a moving platform 120 (e.g., a ship) in relation to a three dimensional coordinate system. The IMU 110 can be oriented and positioned according to an X coordinate, a Y coordinate and a Z coordinate. Similarly, the moving platform 120 can be oriented and positioned according to an X coordinate, a Y coordinate and a Z coordinate.

Inertial navigation solutions can be based on strapdown solutions using IMU motion measurements from the IMU 110, which can be blended with GPS measurements, in order to correct for IMU drifting. The drift can reduce an accuracy level of the IMU 110 over a period of time. Inertial navigation solutions may only be useful if the axes of the IMU 110 are aligned with the axes of the installation platform or the moving platform 120. In other words, if the axes of the IMU 110 are misaligned with the axes of the moving platform 120, then position, velocity, attitude and/or attitude velocity calculated based on the measurements from the IMU 110 may not accurately reflect an actual movement and orientation of the moving platform 120. High precision navigation systems need to have the IMU 120 aligned with the platform axes with precise tolerance (e.g., 0.002 degrees) and with high integrity assurance As described in further detail below, a novel real-time sensor installation monitor (RSIM) can automatically align the axes of the IMU 110 to the axes of the moving platform 120, such as a ship or an aircraft. RSIM can accurately and with high intensity calculate a misalignment between the axes of the IMU 110 and the axes of the moving platform 120 (or the installation platform). A misalignment correction value can then be applied to subsequent IMU measurements from the IMU 110, wherein the subsequent IMU measurements can be used in precision inertial navigation solutions. In one example, the misalignment between the IMU 110 and the moving platform 120 can be corrected to an accuracy of 0.002 degrees in less than two hours with high integrity assurance.

Figure 2:
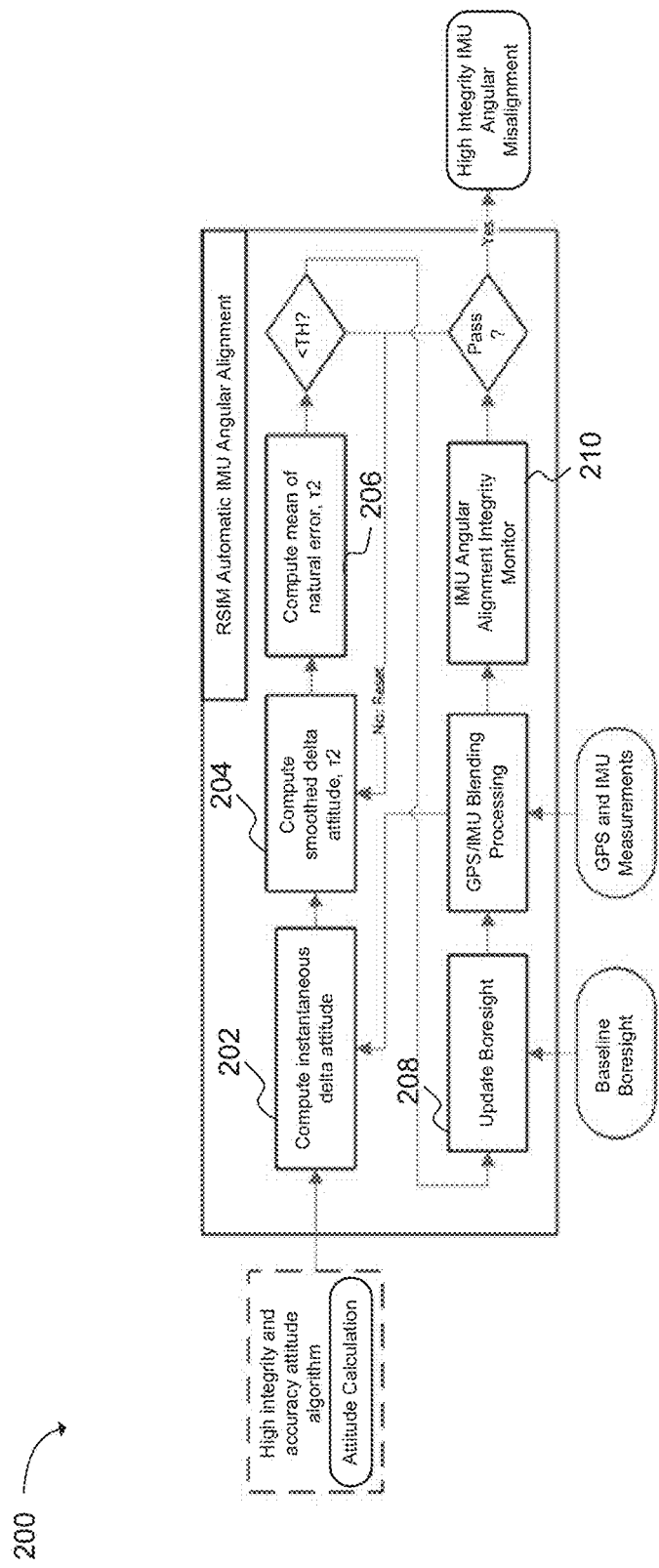
FIG. 2 is a flowchart illustrating a technique for correcting a misalignment between axes of an inertial measurement unit (IMU) and axes of a moving platform in accordance with an example.

FIG. 2 is an exemplary flowchart 200 illustrating a technique for correcting a misalignment between axes of an inertial measurement unit (IMU) and axes of a moving platform. The misalignment between the axes of the IMU and the axes of the moving platform can be corrected using a real-time sensor installation monitor (RSIM). The RSIM can provide a capability to automatically correct the misalignment between the IMU axes and the moving platform (or installation platform) axes to an accuracy of 0.002 degrees in less than two hours. In contrast, traditional technique can take several days and involve a manual, offline process that is less accurate and has no integrity assurance.

The IMU can be installed on the moving platform and provide IMU measurements. In addition, global positioning system (GPS) measurements can be taken for the moving platform (e.g., via a GPS receiver). Thus, a GPS-blended inertial solution can be implemented in order to determine an attitude or orientation of the moving platform. In particular, the GPS-blended inertial solution can be implemented in order to determine a roll, pitch and yaw of the moving platform. Another form of navigation solution is the strapdown solution where the navigation solution is calculated using IMU measurements without GPS aided correction. The strapdown solution does not correct for IMU drift, thus only provides a short term navigation solution and often degrades in performance during a long period of time. However, IMU design can be improved to remove or reduce the need for GPS aided correction in the near future. RSIM are applicable to both types of navigation solutions."

In addition, an attitude of the moving platform can be determined using a high accuracy attitude source, such as a Real Time Attitude Determination (RTAD) system. In other words, the attitude provided by RTAD can be assumed as the truth. In one example, in order to determine the attitude, the RTAD system can generate in real time a multiple-dimensional state vector of integer ambiguities and multiple dimensional corrections using double difference (DD) measurements for pseudo-range (PR) and carrier phase (CP) pairs generated from at least three global positioning system (GPS) receivers. The RTAD system can accurately determine the attitude of the moving platform from the multiple-dimensional state vector. In one example, the RTAD can include a differential GPS-based processor that uses high intensity carrier phase integer ambiguity resolution, which can achieve attitude accuracies on the order of 0.05 milli-radians.

The GPS/IMU measurements can be compared with a high fidelity attitude truth source, such as the RTAD system. In other words, the measured attitude of the moving platform based on the GPS/IMS measurements can be compared with the attitude of the moving platform according to the attitude truth source. In one example, the attitude of the moving platform according to the attitude truth source can also be referred to as a known attitude. In step 202, an instantaneous delta attitude can be calculated from a difference between the known attitude (i.e., the attitude provided by the truth source) and the attitude determined from the GPS/IMS measurements.

In step 204, the delta attitude can be provided to a low pass filter (e.g., a low pass averaging filter) that can compute an angular misalignment value between the axes of the IMU and the axes of the moving platform. In other words, the low pass filter can remove the natural error from the delta attitude in order to produce the angular misalignment value. The angular misalignment value ($\Delta\alpha$) can also be referred to as the boresight. The delta attitude (or instantaneous attitude difference) can be low pass filtered to provide the accurate misalignment correction values, wherein noisy GPS/IMU measurements (i.e., noisy when compared to the attitude truth source) are averaged over a period of time ($\tau_1$). A smoothed delta attitude (i.e., the IMU angular misalignment) can be calculated using the low pass filter with time constant ($\tau_1$).

The angular misalignment value ($\Delta\alpha$) can be subtracted from the delta attitude to calculate the natural error components in the combined attitude truth and GPS/INS solution. In other words, the natural error that is removed from the delta attitude using the low pass filter can be extracted. In step 206, a mean of the natural error component can be passed through another low pass filter (e.g., a low pass average filter) with a time constant ($\tau_2$). The time constant ($\tau_2$) can be substantially smaller than the time constant ($\tau_1$). If the mean of the natural error is less than a near zero threshold (T), then the calculation of the angular misalignment value ($\Delta\alpha$) continues. If the mean of the natural error is greater than T, this indicates that additional error components other than natural error components were present in the GPS/INS solution or the attitude truth source. Additional error components include uncorrelated transient error caused by filter warm up, sensor measurement anomaly, etc. Therefore, the current misalignment correction value ($\Delta\alpha$) is reset and recalculated starting from the beginning (i.e., the GPS-blended inertial solution is repeated and an updated attitude is provided by the attitude truth source, the delta attitude can be recalculated, and so on). In other words, the natural error mean can be monitored using the low pass filter with time constant ($\tau_2$), wherein $\tau_2 \ll \tau_1$. When the natural error mean is greater than a threshold (Thnz), this indicates that additional unknown error components are present, and therefore, the smoothed delta attitude calculation can be reset. The time constants in the low pass filters (e.g., $\tau 1$ and $\tau 2$) and the near-zero threshold (e.g., T or Thnz) can be tuned to balance the filter sensitivity and accuracy.

After a continuous angular misalignment value ($\Delta\alpha$) is calculated for a preset time constant, the angular misalignment value ($\Delta\alpha$) can be added to a baseline boresight value (or baseline angular alignment value) in order to compute a total boresight value ($\Delta\beta$), as in step 208. The total boresight value can also be referred to as a total angular alignment value. The total boresight value ($\Delta\beta$) can be incorporated in the GPS/INS solution processing. In other words, the estimated misalignment corrections can be applied to subsequent IMU measurements. Thus, the baseline boresight can be updated to incorporate the misalignment correction. The IMU can incorporate the total boresight value for subsequent attitude measurements in order to produce substantially accurate attitude acceleration measurements of the moving platform. Although this solution does not resolve the physical misalignment between the IMU with the moving platform, this solution effectively solves the physical misalignment problem because the IMU measurements from the IMU are corrected, such that these IMU measurements substantially correspond with the actual movements and orientation of the moving platform, despite a slight physical misalignment between the axes of the IMU and the axes of the moving platform. In the solution described above, the angular misalignment accuracy can be calculated within 0.0005 degrees.

The estimated misalignment corrections are applied to the IMU measurements. The process iteratively verifies the boresight results and estimates the new misalignment corrections given the latest applied corrections, and converges when an attitude misalignment threshold is met. This iterative process can converge in two or three iterations. In one example, the entire process can take no more than two hours. Furthermore, multiple IMUs can be boresighted concurrently and be completed within the two-hour time frame.

In one configuration, the novel GPS/INS solution calculated with the total boresight value ($\Delta\beta$) can be monitored through an angular misalignment integrity monitor for a period of time, as in step 210. There are several ways to monitor the GPS/INS solution. For example, the total boresight value ($\Delta\beta$) can be monitored for the next iteration against a predefined threshold. In another example, the new strapdown/GPS IMU blending solution can be compared with other strapdown/GPS IMU blending solutions if they are available. In yet another example, the new strapdown/GPS IMU blending solution can be compared with the truth attitude.

If the angular misalignment integrity monitor passes for a period of time, the baseline boresight will be updated and the boresight process is completed. If the angular misalignment integrity monitor fails, the calculation for the angular misalignment value ($\Delta\alpha$) is reset and the process is started from the beginning.

Figure 3:
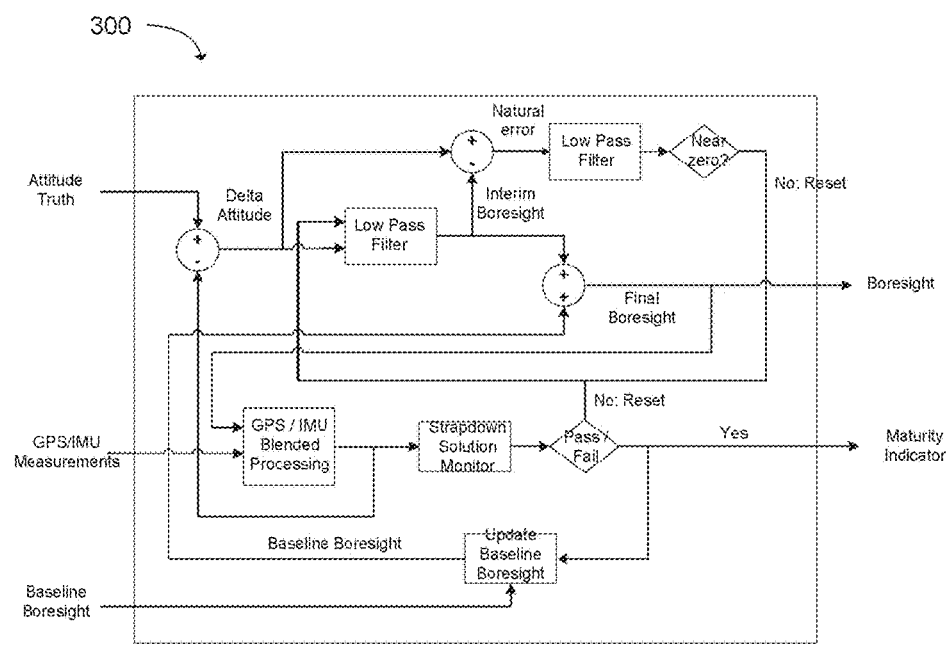
FIG. 3 is a diagram illustrating a technique for correcting a misalignment between axes of an inertial measurement unit (IMU) and axes of a moving platform in accordance with an example.

FIG. 3 is a diagram 300 illustrating an exemplary technique for correcting a misalignment between axes of an inertial measurement unit (IMU) and axes of a moving platform. The IMU can be installed on the moving platform, such as a ship. The IMU can take IMU measurements of the moving platform's orientation and motion. In addition, the moving platform can include a GPS receiver that can take GPS measurements of the moving platform's location. The IMU measurements and the GPS measurements can be blended to determine the moving platform's attitude. The attitude computed using GPS/IMU blended processing can be compared with a truth attitude (i.e., a known attitude of the moving platform that is provided by a truth source). The comparison can result in a delta attitude. The delta attitude can pass through a low pass filter to remove noise from the delta attitude, which can result in an interim boresight (i.e., an angular misalignment value). The noise can pass through an additional low pass filter. If a mean of the noise is less than a threshold, then calculation of the angular misalignment continues. If the mean of the noise is greater than the threshold, then calculation of the angular misalignment is reset and the process is restarted. The interim boresight can be added to a baseline boresight in order to produce a final boresight. The final boresight can be incorporated into the GPS/IMU blended processing. In addition, a strapdown solution can be monitored, and if the strapdown solution meets a threshold for a period of time, the baseline boresight can be updated and the boresight process is completed. Otherwise, the calculation of the angular misalignment is reset and the process is restarted.

Figure 4A:
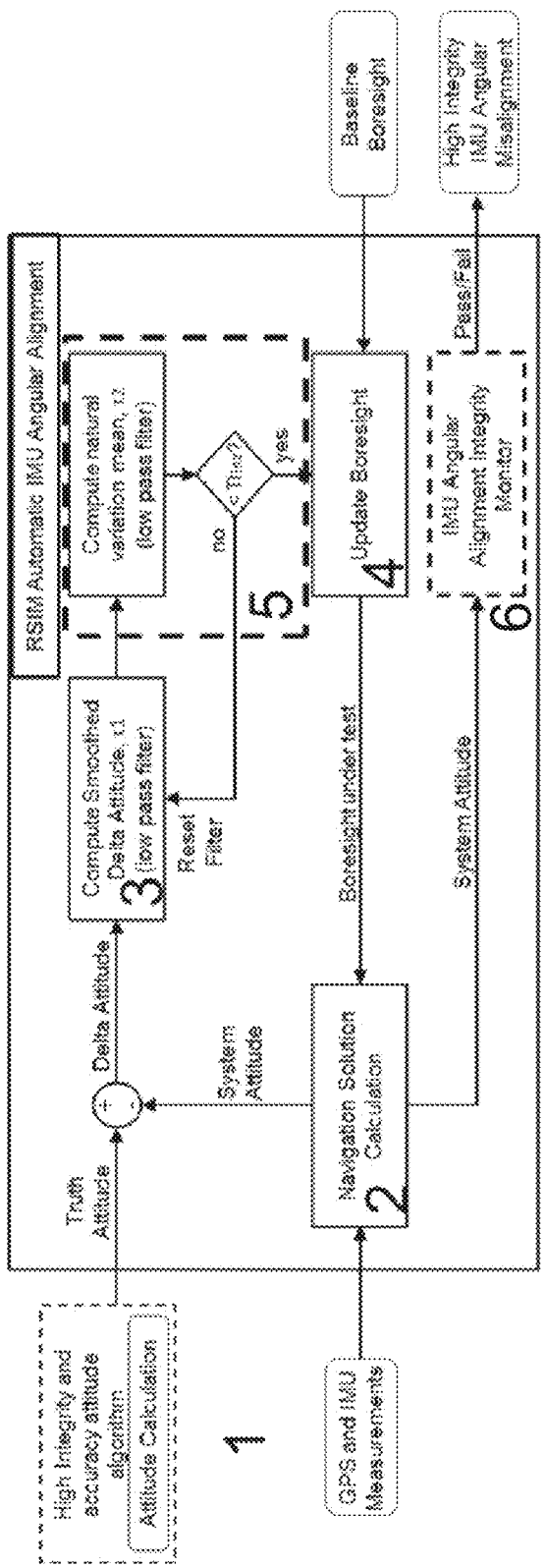
FIGS. 4A-4B are diagrams illustrating techniques for correcting a misalignment between axes of an inertial measurement unit (IMU) and axes of a moving platform in accordance with an example.
Figure 4B:
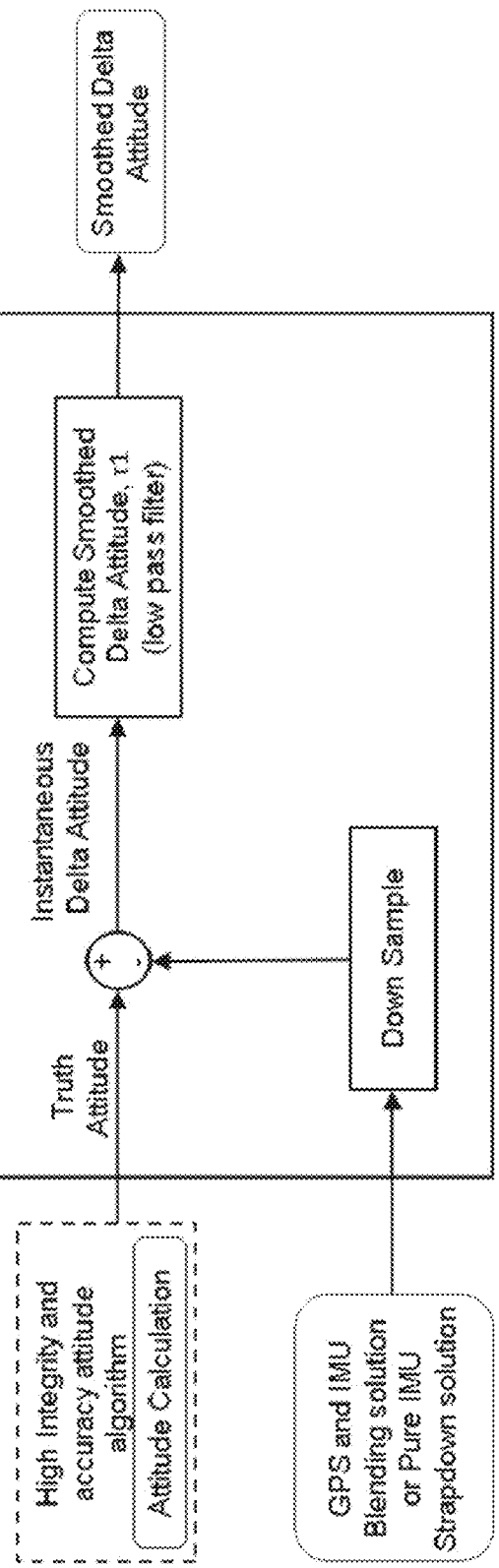

FIGS. 4A-4B illustrate exemplary techniques for correcting a misalignment between axes of an inertial measurement unit (IMU) and axes of a moving platform. As shown in FIG. 4A, step 1 can involve inputting or receiving high integrity and accuracy attitudes (e.g., computed by RTAD), as well as GPS measurements from GPS sensors and inertial measurements from IMU sensors. Step 2 can involve computing a navigation solution using one of following techniques: a GPS/IMU blending solution using GPS and IMU measurements, an IMU strapdown solution, or another inertial navigation solution. Step 3 can involve computing a smoothed attitude difference between the high integrity and accuracy attitude solution and the GPS/IMU blending solution. Step 4 can involve updating a boresight value with a previous iteration boresight value (e.g., pre-surveyed attitude misalignment values at first iteration can be used). Step 5 (an optional step) can involve monitoring natural variation mean in order to detect an uncorrelated anomaly in the GPS/IMU blending processing and the truth attitude calculation results. Step 6 (an optional step) can involve an IMU Angular Alignment Integrity Monitor for high integrity assurance.

In step 1, the high integrity and accuracy attitude calculation algorithm can be performed using Real Time Attitude Determination (RTAD). The standard GPS measurements from GPS sensors and inertial measurements from IMU sensors are used in the navigation solution calculation.

In step 2, there are several types of navigation solutions that can be used. Examples of such navigation solutions include a GPS/IMU blending solution, an IMU strapdown solution, a conventional Inertial Navigation Solution (INS), etc. The navigation solutions are well established for utilizing IMUs with GPS aiding. The GPS/IMU blending solution can use GPS satellite signals to correct or calibrate a solution from an Inertial Navigation System (INS). The Inertial navigation solution is a self-contained navigation technique in which measurements provided by accelerometers and gyroscopes (i.e., gimbals) are used to track the position and orientation of an object relative to a known starting point, orientation and velocity. Lightweight digital computers strapped to a vehicle, which permit the system to eliminate the gimbals, can lead to the strapdown solution.

In step 3, the smoothed delta attitude can be calculated, which is shown in greater detail in FIG. 4B. A truth attitude solution calculated by a differential GPS algorithm, such as RTAD, is likely to have a lower sample rate than a GPS/IMU blending navigation solution. Therefore, the GPS/IMU blending solution can be down sampled before calculating an instantaneous delta attitude. The instantaneous delta attitude can be characterized as following:

$$\Delta\theta_t = \Delta\theta + \varepsilon_{Tru_t} + \varepsilon_{Nav_t} + \varepsilon_{at} \text{ wherein,}$$

$\Delta\theta_t$ is the instantaneous delta attitude at time t; $\Delta\theta$ is the true misalignment, is constant and is time independent; $\varepsilon_{Tru_t}$ is the error in the truth attitude during the steady state in step 1; $\varepsilon_{Nav_t}$ is the error in the navigation solution during the steady state in step 2; $\varepsilon_{at}$ is the uncorrelated transient error between the truth attitude solution and the GPS/IMU blending solution at time t, which can be caused by filter warm up, sensor measurement anomaly, etc.

In step 3, $\varepsilon_{at}$, which represents possible input anomaly and transient conditions, can be detected and addressed. A low pass filter can be used to filter the $\varepsilon_{Tru_t}$ and $\varepsilon_{Nav_t}$. An example low-pass average filter is illustrated below:

$$\Delta\theta s_t = \Delta\theta s_{t-1} + \frac{\Delta t}{\tau}(\Delta\theta_t - \Delta\theta s_{t-1}),$$

wherein $\Delta\theta s_t$ is the smoothed delta attitude at time t. The duration for the low-pass average filter, $\tau_1$ can be tuned to balance availability and accuracy.

In step 4, since the automatic boresight algorithm can be implemented by iteration, the estimated boresight values from each iteration can be accumulated over time. This step serves both as the accumulator for the boresight values and the end condition for the iteration algorithm. A pre-survey misalignment (with insufficient accuracy) can be utilized to start the algorithm. If the boresight result from the current iteration is within tolerance, then the automatic boresight algorithm can be stopped and the accumulated boresight value can be stored and used in the future.

In step 5, the GPS/IMU blending solution (which can utilize a Kalman filter) has a converging time period before the solution is useable. In addition, the GPS/IMU blending solution and the truth attitude solution depend on GPS and/or IMU sensor measurements which can be affected by external interference. In order to safe guard the integrity of the boresight calculation, two types of error can be monitored: a gradual ramping error (e.g., due to filter warm up) and an instantaneous error (e.g., due to sensor measurement anomaly).

After the smoothed boresight value is calculated in accordance with $$\Delta\theta s_t = \Delta\theta s_{t-1} + \frac{\Delta t}{\tau}(\Delta\theta_t - \Delta\theta s_{t-1}),$$

the smoothed boresight value can be expressed as following:

$$\Delta\theta s_t \cong \Delta\theta + \frac{\Delta t}{\tau}\sum_{t=0}^{\tau_1}\varepsilon_{at},$$

wherein $\Delta\theta s_t$, is the smoothed delta attitude at time t; $\Delta\theta$ is the true misalignment; $\varepsilon_a$ is the uncorrelated error between the truth attitude solution and the GPS/IMU blending solution; and $\tau_1$ is the smoothing window for the low pass average filter in the number of sampling periods in step 3. In one example, $\varepsilon_{Tru_t}$ and $\varepsilon_{Nav_t}$ can become negligible after the smoothing process.

In one example, subtracting $\Delta\theta s_t$ from the instantaneous boresight value, $\Delta\theta_t$ provides:

$$\Delta\theta_t - \Delta\theta s_t = (\Delta\theta + \varepsilon_{Tru_t} + \varepsilon_{Nav_t} + \varepsilon_{at}) - \left(\Delta\theta + \frac{\Delta t}{\tau_1}\sum_{t=0}^{\tau_1} \varepsilon_{at}\right)$$

$$= \varepsilon_{Tru_t} + \varepsilon_{Nav_t} + \varepsilon_{at} - \frac{\Delta t}{\tau_1}\sum_{t=0}^{\tau_1} \varepsilon_{at}$$

A smoothing technique, similar to that in step 3, is used to smooth the difference using a low pass average filter for a duration of $\tau_2$ where $\tau_1 \gg \tau_2$. The resulting error metric is:

$$\epsilon_m = \frac{\Delta t}{\tau_2}\sum_{t=0}^{\tau_2} \varepsilon_{Tru_t} + \frac{\Delta t}{\tau_2}\sum_{t=0}^{\tau_2} \varepsilon_{Nav_t} + \frac{\Delta t}{\tau_2}\sum_{t=0}^{\tau_2} \varepsilon_{at} - \frac{\Delta t}{\tau_1}\sum_{t=0}^{\tau_1} \varepsilon_{at}$$

$$\cong \frac{\Delta t}{\tau_2}\sum_{t=0}^{\tau_2} \varepsilon_{at} - \frac{\Delta t}{\tau_1}\sum_{t=0}^{\tau_1} \varepsilon_{at}.$$

In one example, if there is no uncorrelated transient error between the truth attitude solution and the GPS/IMU blending solution, then $\epsilon_m$ is equal to the mean of $\varepsilon_{Tru_t} + \varepsilon_{Nav_t}$, which is approximately zero. If the sum of the uncorrelated transient error is very close to zero during $\tau_1$, then $\Delta\theta s_t \cong \Delta\theta$ and individual $\varepsilon_{at}$ has no substantial impact to the boresight calculation. If the value of $\tau_1 \cong \tau_2$, then $\epsilon_m$ is near zero regardless of the values of $\varepsilon_{at}$. Under a gradual ramping error condition, $\epsilon_m$ is more observable as the difference between $\tau_1$ and $\tau_2$ gets larger. In an ideal scenario, $\tau_1 \gg \tau_2$. Therefore, by monitoring the absolute value of $\epsilon_m$ against a near-zero threshold with the appropriate values of $\tau_1$ and $\tau_2$, and resetting the low pass filter when $\epsilon_m >$ a near-zero threshold or $\tau_2$ has been reached, the gradual ramping error can be detected and mitigated accordingly. In the case of uncorrelated instantaneous error, it can be easily detected through monitoring the difference between instantaneous delta attitude $\Delta\theta_t$ and $\Delta\theta_{t-1}$.

In step 6, in order to ensure that a high integrity navigation solution is produced after the automatic boresight algorithm is applied, a navigation solution integrity monitor can be implemented. If a system provides multiple sensors that can produce multiple independent navigation solutions, these solutions can be cross-checked during a period of time to ensure the solution consistencies. The differences between current and previous navigation solutions can be cross checked against a predefined threshold to ensure the solutions are consistent with physical dynamic movement limitations of the platform. The higher sample rate navigation solutions can also be down sampled and cross-checked with the RTAD solution for a period of time to ensure navigation solution integrity.

Self-Survey of Sensor Installation

Deploying a mobile precision navigation system in a quick period of time (e.g., within 90 minutes) can be infeasible using traditional techniques due to cost and time constraints. Conventional survey techniques require significant time (multiple days) and considerable cost to survey GPS sensor locations in a precision navigation system. Prior systems can include a plurality of sensors (e.g., GPS sensors, navigation sensors, IMU sensors) that assist aircraft to land on a landing platform. In particular, the amount of time needed to manually survey a distance between the sensors can be a limiting factor. If the survey for the sensors is not accurately performed, then "truth" information on the sensors' precise location can be incorrect. As a result, incorrect navigation information can be provided to the aircraft landing on the landing platform.

Unlike prior systems, a novel real time sensor installation monitor (RSIM) algorithm provided herein can rapidly determine precise, three dimensional (3D) measurements for a GPS-based system. Given a rough initial survey estimate, RSIM can iterate over time to generate a highly accurate calculated survey distance between navigation sensors. The RSIM can use an advanced differential GPS technique (e.g., high integrity real time kinematics) to automatically and quickly determine accurate survey results with high integrity assurance. In addition, the RSIM can provide high integrity assurance for the survey results, which can be suitable for safety critical solutions. Additional platforms that can benefit from the self-survey of sensor installations include, but are not limited to, civil structures such as bridges, large buildings, airports or military structures such as aircraft landing structures with high precision navigation systems. The high precision navigation system will be the example used to describe the following method for self-survey of sensor installations.

Conventional survey techniques verify survey results by performing statistical tests on the survey measurement residuals over a given time period. This statistical monitoring technique is also feasible in conjunction with the high integrity RSIM self-survey method presented in the above section. RSIM can further ensure high integrity for a fixed platform by calculating carrier phase measurement residuals, over a given time, and ensuring the residuals obey an expected distribution given the final survey accuracy. For a mobile platform, the Real Time Attitude Determination System (RTAD) can be used to resolve carrier phase integer ambiguities with high integrity and provide measurement residual statistics over a period of time. By monitoring the carrier phase measurement residuals over time, RSIM can provide additional integrity to the survey result for fixed and mobile platforms.

Figure 5:
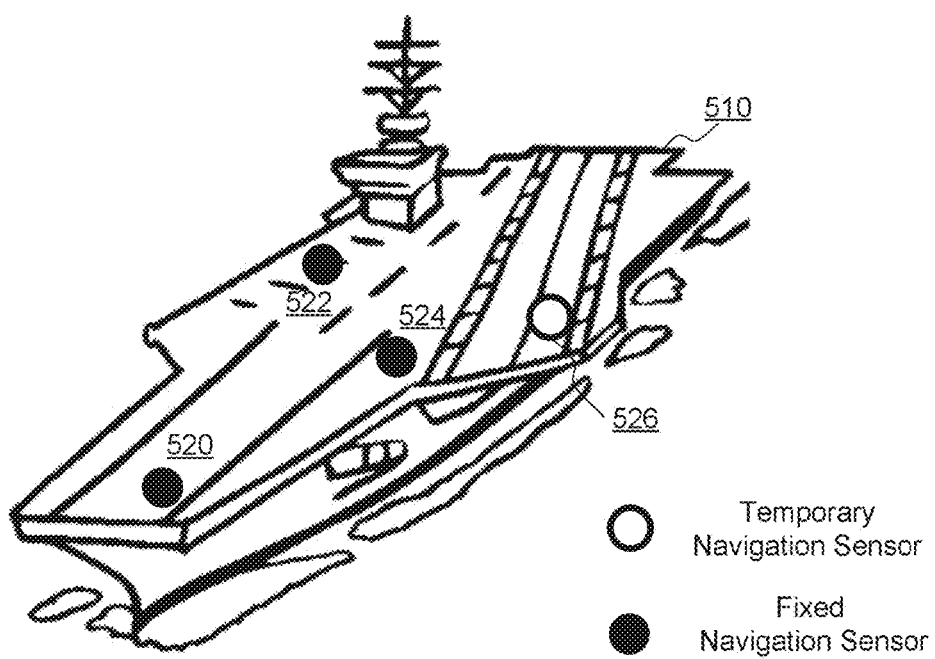
FIG. 5 illustrates a temporary navigation sensor and a plurality of fixed navigation sensors that are installed on a landing platform in accordance with an example.

FIG. 5 illustrates a temporary navigation sensor 526 and a plurality of fixed navigation sensors 520, 522 and 524 on a landing platform 510, such as a ship, airfield, etc. The fixed navigation sensors 520, 522 and 524 can be permanently installed on the landing platform (e.g., the ship or airfield), whereas the temporary navigation sensor 526 can be temporarily placed on the landing platform 510. The temporary navigation sensor 526 and the plurality of fixed navigation sensors 520, 522 and 524 can be used to generate a highly accurate calculated survey distance between the navigation sensors.

On fixed, land-based systems, one navigation sensor location can be used to enable RSIM to perform very precise baseline calculations relative to the known sensor location. In other words, relative survey vectors can be found using the temporary navigation sensor 526 (e.g. a temporary GPS sensor) as a reference point (RP). The temporary navigation sensor 526 can be placed at the TDP and the very precise baseline calculations can be performed relative to the TDP. RSIM can compute relative or rough baseline vectors from each fixed navigation sensor to the temporary navigation sensor 526. In other words, a first baseline vector can be computed between the temporary navigation sensor 526 and a fixed navigation sensor 520, a second baseline vector can be computed between the temporary navigation sensor 526 and a fixed navigation sensor 522, and a third baseline vector can be computed between the temporary navigation sensor 526 and a fixed navigation sensor 524. The rough baseline vectors can be computed using differential GPS techniques. Carrier phase ambiguities in the rough baseline vectors can be corrected (e.g., using RTAD), which can result in high accuracy baseline vectors. These high accuracy baseline vectors can accurately provide the calculated survey distance between the navigation sensors. Upon completion of the self-survey, the temporary navigation sensor 526 can be removed from the landing platform 510.

In many systems, RSIM can utilize the GPS sensors already in the system to determine a rough survey estimate and then iterate over a relatively short amount of time (less than 30 minutes from the start of sensor operation) to gain a highly accurate set of relative position survey measurements.

Figure 6:
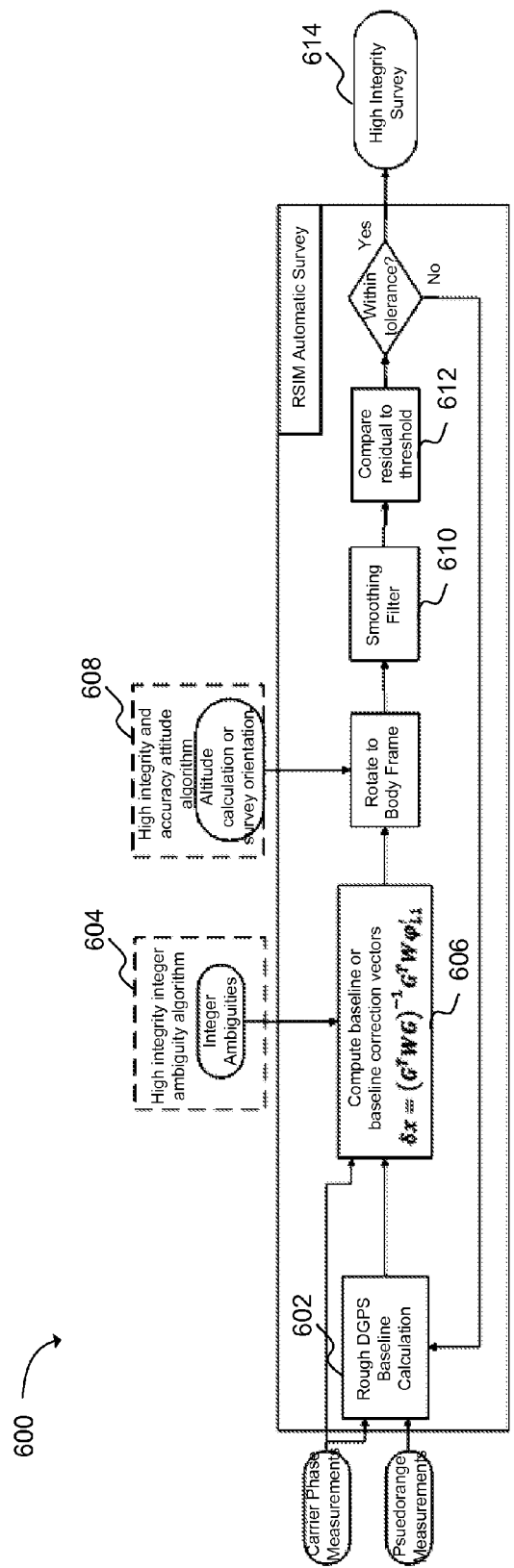
FIG. 6 is a flowchart illustrating a technique for surveying a distance between navigation sensors that are installed on a landing platform in accordance with an example.

FIG. 6 is a flowchart 600 illustrating an exemplary technique for surveying a distance between navigation sensors that are installed on a moving platform. For example, a calculated survey distance can be performed between a temporary navigation sensor and a plurality of fixed navigation sensors. A rough baseline vector can be computed between the temporary navigation sensor and a fixed navigation sensor, as in step 602. The rough baseline vector can be computed using differential GPS techniques. For example, the rough baseline vector can be computed using carrier phase measurements and pseudo range measurements. In addition, the rough baseline vector can provide an initial geometry matrix for differential GPS (DGPS) calculations.

An external algorithm can provide high integrity integer ambiguities for the carrier phase measurements, as in step 604. In one example, the external algorithm can be from a high accuracy and integrity attitude source, such as a Real Time Attitude Determination (RTAD) system. The carrier phase measurements (used for calculating the rough baseline vector), the geometry matrix, and the integer ambiguities (e.g., from RTAD) can all be used to compute a baseline or baseline correction vector, as in step 606. The baseline correction vector can represent a high accuracy and integrity baseline correction vector between the temporary navigation sensor and the fixed navigation sensor. The baseline correction vector can also be referred to as a refined baseline vector. In one example, the baseline correction vector ($\delta x$) is calculated using $\delta x = (G^T W G)^{-1} G^T W \varphi'$, wherein G is a line of sight geometry matrix, T is the matrix transpose operation, W is a weighting matrix, and $\varphi'$ is an updated carrier phase measurement. In one example, G can represent a double difference line of sight geometry matrix that is calculated using differential GPS techniques. In addition, $\varphi' = \varphi - \lambda N = G \delta x + \varepsilon$, wherein $\varphi = G \delta x + \lambda N + \varepsilon$, wherein $\varphi$ is an initial carrier phase measurement, $\lambda$ is a wavelength, N is a carrier phase integer ambiguity, and $\varepsilon$ is a measurement error. The carrier phase integer ambiguity (N) can be fixed for different wavelength combinations, such as an L1 wavelength, an L2 wavelength, a wide lane (WL) wavelength or a narrow lane (NL) wavelength. In other words, the rough baseline vector can be refined (using information from RTAD) in order to produce the refined baseline vector. The refined baseline vector can provide a more accurate estimation of the distance between the temporary navigation sensor and the fixed navigation sensor as compared to the rough baseline vector.

The refined baseline vector can be translated into a local coordinate system (or body frame), as in step 608. In one example, the refined baseline vector can be rotated to the body frame using a high accuracy attitude computed externally (e.g., using RTAD) if the landing platform is mobile. For example, RTAD can provide a high integrity and accuracy attitude calculation or survey orientation, which can be used to rotate the refined baseline vector to the body frame. In an alternative scenario, the external algorithms used in steps 604 and 608 can be based on separate attitude sources. The refined baseline vector in the body frame (or local frame) can be provided to a low pass filter (e.g., a smoothing filter) with a time constant ($\tau$), as in step 610. The refined baseline vector in the body frame can be smoothed for a set duration of time. The survey measurement residuals can be compared with a defined threshold, as in step 612. If the survey measurement residuals are within a defined tolerance level, then validated high integrity and accuracy survey measurements can be outputted, as in step 614. The survey measurements can represent a calculated survey distance between the navigation sensors on the landing platform. If the survey measurement residuals are not within the defined tolerance level, then the process can be repeated (i.e., an updated refined baseline vector can be calculated, and so on).

Figure 7:
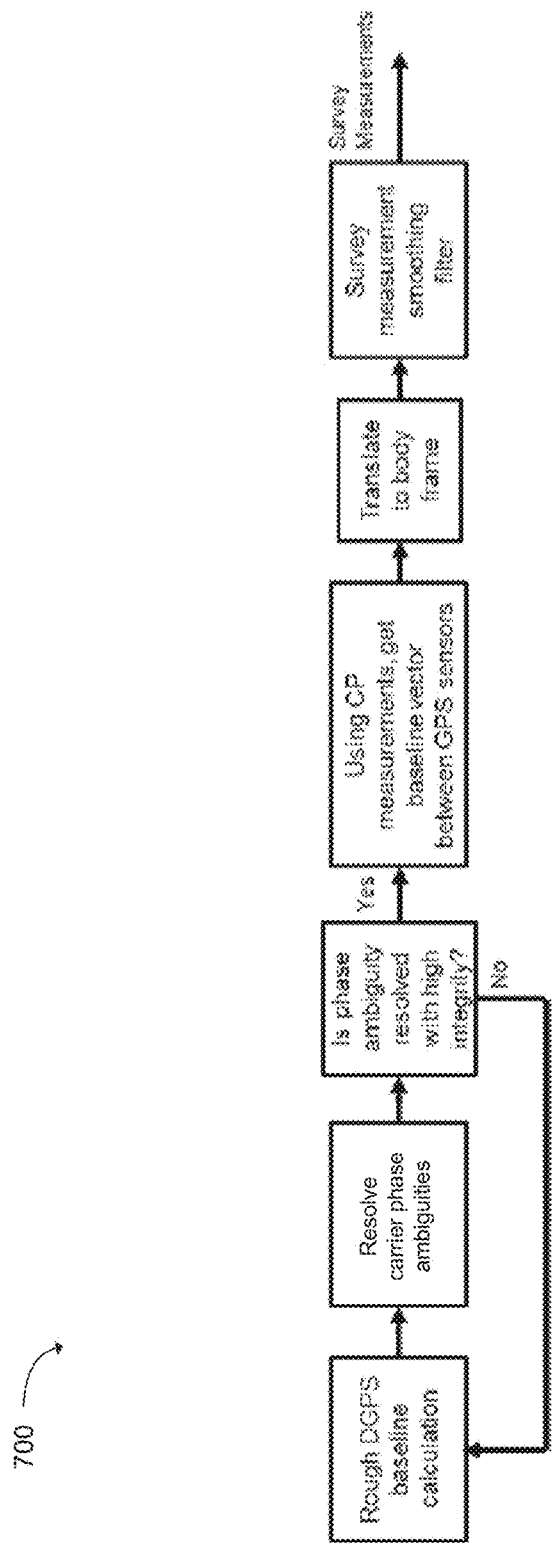
FIG. 7 is another flowchart illustrating a technique for surveying a distance between navigation sensors that are installed on a moving platform in accordance with an example.

FIG. 7 is a flowchart 700 illustrating an exemplary technique for surveying a distance between navigation sensors that are installed on a landing platform. For example, a calculated survey distance can be performed between a temporary navigation sensor and a plurality of fixed navigation sensors. The survey distance can be calculated using a real time sensor installation monitor (RSIM) algorithm. By combining a rough, relative survey, via differential GPS, with highly accurate corrections, RSIM allows for GPS sensor installations to automatically generate survey information. A rough position estimate for each navigation sensor can be computed using differential GPS (DGPS) techniques. In other words, rough baseline vectors can be computed for pairs of navigation sensors on the landing platform. The rough relative survey can then be processed to fix double difference carrier phase ambiguities in the rough baseline vectors using a truth source, such as RTAD. If a phase ambiguity is not resolved with high integrity, then the rough baseline vector can be recalculated. If the phase ambiguity is resolved with high integrity, then the double difference ambiguities are used with carrier phase measurements to calculate an ultra-accurate baseline vector between navigation sensors (e.g., GPS sensors). The ultra-accurate baseline vector can be translated to a body frame using attitude information from RTAD. After multiple epochs of measurements are passed through the smoothing filter, for extra redundancy and additional error correction, a three dimensional, high integrity correction can be provided. In other words, resulting survey measurements can indicate the survey distance between the navigation sensors. When an absolute navigation solution is desired, at least one sensor location is to be known in order to translate the differential survey to the fixed frame of reference. For a relative navigation system, the differential survey can be initially referenced to a temporary sensor location (most commonly set at the touchdown point, TDP). After the self-survey is complete the sensor at the TDP can be removed from the survey solution.

In one configuration, by combining a rough, relative survey, via differential GPS, with highly accurate corrections, RSIM can allow for GPS sensor installations to automatically generate survey information. First, a rough relative position estimate for each sensor can be computed using differential GPS techniques. An absolute position, accurate to 100 meters, is used to compute the relative position estimates. The absolute position can be found using established GPS positioning solutions. The rough relative survey can then be processed by an algorithm that fixes double difference carrier phase ambiguities, such as RTAD. The double difference ambiguities are used with carrier phase measurements to calculate an ultra-accurate baseline vector between GPS sensors. After multiple epochs of measurements are passed through the smoothing filter, for extra redundancy and additional error correction, a three dimensional, high integrity correction can be provided. If the system entails an absolute navigation solution, one sensor location can be known in order to translate the differential survey to the fixed frame of reference. For a relative navigation system (typically that is all that is necessary to land aircraft), the differential survey can be initially referenced to a temporary sensor location (e.g., commonly set at the touchdown point, TDP). After the self-survey is complete the sensor at the TDP can be removed from the survey solution.

Figure 8:
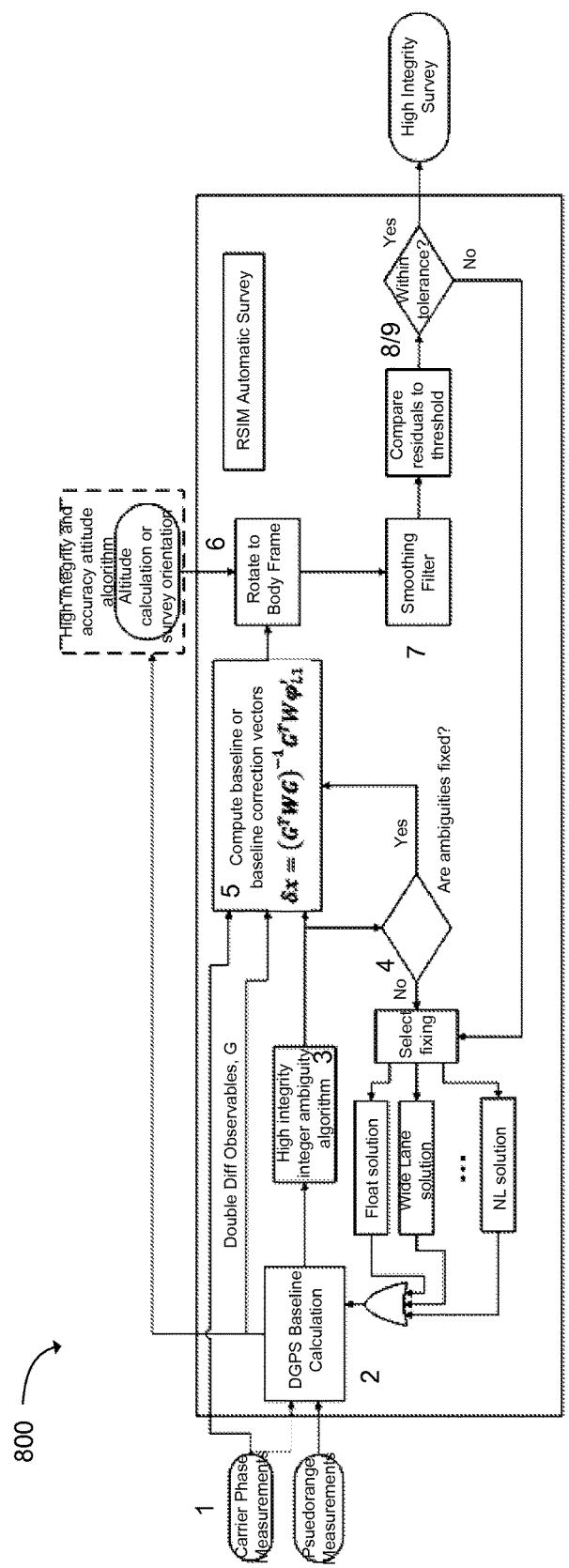
FIG. 8 is yet another flowchart illustrating a technique for surveying a distance between navigation sensors that are installed on a landing platform in accordance with an example.

FIG. 8 is an exemplary flowchart 800 illustrating a technique for surveying a distance between navigation sensors that are installed on a physical platform. This technique can be referred to as a self-survey algorithm. As shown in FIG. 8, step 1 can include inputting or receiving carrier phase and pseudorange measurements. Step 2 can include computing an initial estimate for a baseline vector between the sensors (e.g., navigation sensors), or inputting or receiving an initial baseline vector estimate from an external source. Step 3 can include determining the integer ambiguity resolved double difference carrier phase measurement data and the integer ambiguities using the baseline vector estimate. In step 4, If integer ambiguities cannot be fixed to a desired threshold, a bootstrapping technique can be used to fix the ambiguities with a corresponding longer wavelength (although less accurate) until ambiguities with a corresponding shorter wavelength can be fixed (i.e., step 3 can be repeated using the last iterated baseline vectors as a starting point for fixing ambiguities with increasingly shorter wavelengths). Step 5 can include using the initial baseline estimate and integer ambiguities to compute the baseline vectors between sensors using $\delta x=(G^T W G)^{-1} G^T W \varphi'$. Step 6 can include inputting or receiving a high integrity attitude to rotate the baseline vectors from a local navigation frame to a body-fixed frame if the sensors are installed on a moving platform. Step 7 can include smoothing the errors between the baseline vector and the initial baseline vector over a specified time frame to determine the correction to the baseline vector input into step 5. Step 8 can include computing the new baseline vector by applying the baseline vector correction to the vector input into step 5. In step 8, if the desired accuracy does not match the solution used in step 4, then the algorithm can return to step 3 and a higher accuracy fixing technique can be used. When step 5 is reached, the baseline vector computed in step 7 can be used. The bootstrapping technique can be used to incrementally improve the baseline vector accuracy. The self-survey algorithm can proceed to step 9 when the desired accuracy level is met. Step 9 can include comparing the measurement residuals to a specified threshold and outputting a final baseline vector between the GPS sensors if the threshold is met. If the threshold is not met, steps 3 through 9 can be repeated until the threshold is met. In addition, the baseline vector in step 5 is updated each iteration with the vector computed in step 7.

With respect to FIG. 8, in step 1, carrier phase and pseudorange measurements from GPS receivers can be input in order to perform the automatic surveying using GPS sensors. An automatic survey can be performed using at least three GPS receivers in a non-collinear configuration. In order to compute the survey with high integrity, the carrier phase and pseudorange measurements are to be monitored and poor tracks are removed. In one example, smoothing pseudorange measurements can improve the integrity and accuracy of the GPS measurement solutions. The input GPS data, carrier phase and pseudorange measurements can be processed for increased accuracy and integrity, and then inputted into the automatic survey algorithm.

In step 2, a rough initial baseline vector can be used to calculate a high integrity and accuracy baseline solution. The initial baseline vector can be given by an external source (e.g., a manual survey) or computed using GPS sensor data. If the initial baseline vector is input from an external source, then the automatic self-survey algorithm proceeds to step 3. If there is no a priori information of the baseline vectors between the GPS sensors, then an initial rough estimate is computed. There are multiple established techniques for computing a baseline between GPS sensors. In one technique, a differential GPS baseline between GPS sensors can be computed using smoothed pseudorange measurements combined with carrier phase measurements, which results in a wide-lane float solution. The wide-lane float solution can provide an initial baseline vector with a 1 sigma error of about 5 cm. An absolute position, accurate to 100 meters, can be used to determine line-of-sight vectors when computing the relative position estimates. The absolute position can be found using well established GPS positioning solutions.

With respect to step 3, the inputs used for the automatic self-survey algorithm can include the initial baseline vector between the sensors in the system, integer ambiguity resolved double difference carrier phase data, and the integer ambiguities resolved from the carrier phase and pseudorange double difference data. The double difference carrier phase measurement data is an element of the baseline vector calculation. The baseline vector is used to describe the computed distance vector between GPS sensors using the automatic self-survey algorithm. Combined with the integer ambiguities, the carrier phase data can allow for sub-centimeter level accuracy when computing the baseline vector. The raw carrier phase and pseudorange measurements from the GPS receiver are differenced between satellites and receivers to provide the double difference carrier phase measurements. Double difference carrier phase measurements are part of high accuracy relative positioning. The initial baseline vector can be used to compute the integer ambiguities for a high integrity solution. The estimated rough sensor location from Step 2 is used in the double difference residual calculation which is used in computing the double difference measurement error covariance. Combined with the smoothed pseudorange and carrier phase measurements, the initial baseline vector can allow for high integrity ambiguity resolution. The fixed carrier phase ambiguities can be combined with the carrier phase measurements to calculate the integer ambiguity resolved double difference carrier phase data, $\varphi_{L1}'$, which is represented as: $\varphi_{L1}'=\varphi_{L1}-\lambda_{L1}N_{L1}=G\delta x+\varepsilon$. The integer ambiguity resolved double difference carrier phase data can be used to compute the baseline vector in step 5 of the self-survey algorithm.

With respect to step 4, the automatic survey can attempt to fix the integer ambiguities using a technique that provides the desired baseline vector accuracy. In some cases, achieving satisfactory integer ambiguity resolution can be challenging for high accuracy fixed solutions. The accuracy of the initial baseline vector can influence whether the integer ambiguities can be fixed. Additionally, different fixing methods can have varying degrees of difficulty when attempting to resolve the integer ambiguities. The final baseline vector accuracy that is desired can drive the technique of ambiguity fixing. Each of the following techniques provides different levels of accuracy: (1) Wide-Lane fixing can provide a baseline vector accuracy of about 5 cm; (2) L2 fixing can provide a baseline vector accuracy of about 1~1.5 cm; (3) L1 fixing can provide a baseline vector accuracy of less than 1 cm; and (4) narrow-lane fixing can provide a baseline vector accuracy of about 0.5 cm. The ability to fix the ambiguities is a function of the technique used as well. The ease in fixing the ambiguities generally improves with a less accurate technique. For example, the wide-lane fixing technique can be the easiest to determine integer ambiguities, and the narrow-lane fixing technique can be the most difficult for determining integer ambiguities.

If the automatic self-survey algorithm is unable to resolve a set number of integer ambiguities over a specified amount of time, then the algorithm can revert to a lower accuracy fixing technique. The algorithm can iteratively change the fixing technique until the ambiguities can be fixed. This is referred to as a bootstrapping methodology for the incremental improvement over iterations. A sample scenario for reverting to a lower accuracy fixing method is as follows: (1) the desired accuracy of the baseline vector is errors of less than 1 cm; (2) the automatic survey algorithm can initiate step 3 (described above) using the L2 fixing technique; (3) the number of fixed ambiguities does not meet a specified threshold over the sampling period; and (4) the automatic survey algorithm can initiate step 3 using the wide lane fixing technique. In the case in which the desired accuracy is not met with the fixing method, the automatic self-survey algorithm can again use the bootstrapping methodology to incrementally improve the accuracy after reaching step 8. The algorithm can be iterated, while improving the accuracy every iteration, until the desired accuracy of the baseline vector is achieved. The algorithm can continue until step 8 before iterating, even if the desired accuracy is not reached, because the baseline vector estimate will not be updated until step 8.

In step 5, the baseline vector can be computed using the carrier phase and the integer ambiguities. The baseline vector can be determined by relating the carrier phase measurements to the geometry between the GPS sensors and the GPS satellites. The matrix (G) relates the GPS receiver to the satellite and is composed of the Line-of-sight vectors between sensor and satellite. The G matrix can be initially computed, or alternatively, the G matrix can be an input into the algorithm. The G matrix is computed using the following: $G_{21}^j = -(\overrightarrow{LOS}_{ECEF}^1 - \overrightarrow{LOS}_{ECEF}^j)$, where $\overrightarrow{LOS}_{ECEF}^j$ is the line-of-sight unit vector from GPS receiver 1 to the jth satellite. With the inputs and the G matrix, the baseline vector can be computed. Using the integer ambiguity resolved double difference carrier phase and the G matrix, the baseline vector is computed using a least squares technique. The weighted least squares technique can be used to solve for the baseline vector from $\delta x = (G^T W G)^{-1} G^T W \varphi_{L1}'$.

Typically, the baseline vector is computed in an inertial frame. As described in further detail below, the next step of the Survey Monitor algorithm can involve translating the baseline vector to a body frame, or a local reference frame.

In step 6, the survey of sensor can be done in a local coordinate frame. The computed baseline vector is in the inertial frame common between satellites and the GPS sensors. To monitor the existing survey vector, the baseline vector is rotated to the local coordinate frame. A high accuracy and integrity attitude is needed to calculate the rotation matrix. The accuracy of the attitude measurement is dependent on the magnitude of the surveyed vectors. For example, an angular error of $\theta$ will translate into a vector error of y for a vector of magnitude y: $y = x \sin \theta$. For an error of less than 1 centimeter and a survey vector of 50 meters, the angular error is to be less than 0.011 degrees. As an example of rotations to local coordinate frame, a standard inertial frame for computing the baseline vectors is in the Earth-Centered, Earth-Fixed (ECEF) coordinate frame, and a standard local coordinate frame is a body frame with positive x forward, positive y to the right, and positive z down. The translation from the ECEF to the local body coordinate frame involves an intermediate rotation to a local tangential plane to the Earth, which is denoted as an East-North-Up coordinate frame. The rotation matrix, $C_{ECEF2LLH}$, using Latitude ($\lambda$) and Longitude ($\phi$) measurements as the angles of rotation, is represented as:

$$C_{ECEF2ENU} = \begin{bmatrix} -\sin\lambda & \cos\phi & 0 \\ -\sin\phi\cos\lambda & -\sin\phi\sin\lambda & \cos\phi \\ \cos\phi\cos\lambda & \cos\phi\sin\lambda & \sin\phi \end{bmatrix}.$$

The translation can be made from the ENU frame to the North-East-Down (NED) using the following equation:

$$C_{ENU2NED} = \begin{bmatrix} 0 & 1 & 0 \\ -1 & 0 & 0 \\ 0 & 0 & -1 \end{bmatrix},$$

and then to the body-fixed frame using the following:

$$C_{NED2Body} = \begin{bmatrix} 1 & 0 & 0 \\ 0 & \cos(r) & \sin(r) \\ 0 & -\sin(r) & \cos(r) \end{bmatrix} \begin{bmatrix} \cos(p) & 0 & -\sin(p) \\ 0 & 1 & 0 \\ \sin(p) & 0 & \cos(p) \end{bmatrix}$$
$$\begin{bmatrix} \cos(y) & \sin(y) & 0 \\ -\sin(y) & \cos(y) & 0 \\ 0 & 0 & 1 \end{bmatrix},$$

wherein r, p, y are the roll, pitch, and yaw attitude measurements in the body-fixed frame. After rotating the baseline vector into the same frame as the survey vector, the survey vector can be monitored.

In step 7, the reliability of the automatic survey can be improved by smoothing the residuals of the baseline vector estimation. By smoothing the residuals over a set time frame, the measurement noise can be reduced. An example smoothing technique can be a lag filter:

$$\epsilon_t = \epsilon_{t-1} + \frac{\Delta t}{\tau}(\varepsilon_s - \epsilon_{t-1}),$$

wherein $\epsilon_t$ is the current smoothed error, $\epsilon_{t-1}$ is the smoothed error from the previous measurement, $\Delta t$ is the time change from the previous measurement, $\tau$ is the tunable time constant, and $\varepsilon_s$ is the measurement error. The time constant ($\tau$) can be adjusted to fit a desired sample size. After determining the baseline vector correction, the new baseline vector can be computed by the following equation: $r_t = r_{t-1} + \delta x$, wherein $r_t$ is the new baseline vector and $r_{t-1}$ is the previous baseline vector.

In step 8, a lower accuracy fixing technique can be used in order fix CP integer ambiguities in the initial time after startup of the automatic self-survey algorithm. In this case, the desired accuracy of the baseline vector may not be reached. If the fixing technique used in step 4 is not to the level of accuracy desired, then the self-survey algorithm can return to step 3. Upon returning to step 3, a higher accuracy fixing technique can be used. For example, if wide-lane fixing was used for the first fixing attempt, but the accuracy desired for the baseline vector is higher than the wide-lane fixing provides, then the L1 fixing technique can be used in the return step 3 and all steps thereafter. The baseline vector input used for steps 3-7 are to be updated with the vector computed in step 7. This vector can have a higher accuracy than the initial vector computed or input in step 2. Using the vector computed in step 7 can allow for incremental improvement in the baseline vector estimate over successive algorithm iterations. Thus, the bootstrapping methodology is again applied to the baseline vector calculation by iterating through steps 3-7 until the baseline vector accuracy is sufficient.

In step 9, the baseline vector estimation can be ensured to converge over multiple iterations. The baseline vector calculated in step 7 is compared to the vector computed in the previous iteration to determine if the solution has converged. If the specified threshold, T, is greater than the baseline vector change between epochs, then the solution has converged, as illustrated in the following equation:

$$T > \text{abs}(r_t - r_{t-1}).$$

If the solution does converge, then the current baseline vector, $r_t$, is output as the final solution. If the solution does not converge, or if the current baseline vector estimate is for the first iteration, and thus there is no estimate for the previous iteration, then the self-survey algorithm can return to step 3. Once again, if returning to step 3, the baseline vector input used for steps 3-7 can be updated with the vector computed in step 7.

Verification of Existing Sensor Surveys

Precise surveying of navigation sensor locations (e.g., GPS antenna locations) relative to the installation platform (e.g., the aircraft carrier on which the navigation sensors are installed) is commonly completed post-installation and pre-operation of the aircraft landing system being deployed. The surveying can indicate a precise distance between various navigation sensors on the installation platform. After a precision navigation system is deployed, it is likely that surveyed locations can be altered relative to the original survey reference point due to temperature variation of the operation environment, wear and tear of the installation platform, motion-induced flexure, etc. In other words, these events can alter a survey distance between a pair of navigation sensors that was previously measured. An incorrect survey distance in relation to an actual distance can result in the precision navigation system providing incorrect differential GPS information to an aircraft attempting to land on the installation platform.

Therefore, it is desirable to periodically verify and validate existing survey results (e.g., using a survey monitor). A real time sensor installation monitor (RSIM) algorithm can be used for performing precise monitoring of post-installation location surveying results. The monitoring can be performed in real time or periodically. RSIM can leverage ultra-accurate differential GPS processing techniques to verify and re-determine, if necessary, a survey to within 1 cm. For example, RSIM can determine a baseline vector between two GPS sensor locations to within 1 cm with high integrity assurance based on a comparison between a current baseline vector and an original surveyed baseline vector. Additional platforms that can benefit from the verification of existing sensor surveys include, but are not limited to, civil structures such as bridges, large buildings, airports or military structures such as aircraft landing structures with high precision navigation systems. The high precision navigation system will be the example used to describe the following method for verification of existing sensor surveys.

Figure 9:
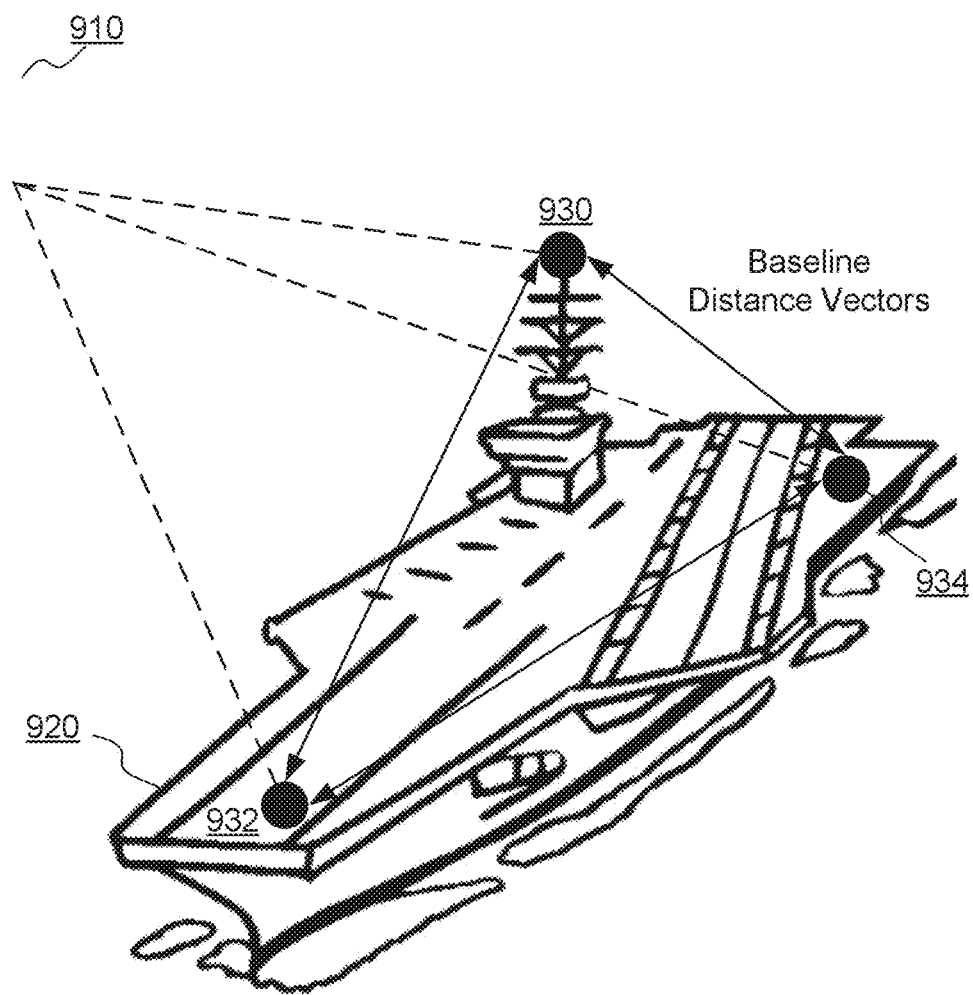
FIG. 9 illustrates a plurality of navigation sensors that are installed on an installation platform in accordance with an example.

FIG. 9 illustrates a plurality of navigation sensors 930, 932 and 934 that are installed on an installation platform 920. In this example, the installation platform 920 can be on a ship, but the installation platform 920 can also be on other surfaces, such as an aircraft or a ground airfield. Thus, the installation platform 920 can be situated on a stationary surface or a non-stationary surface. The navigation sensors 930, 932 and 934 can include GPS sensors, IMU sensors or other types of sensors related to navigation, movement, orientation, motion, etc. The navigation sensors 930, 932 and 934 can receive GPS signals from a GPS satellite 910. A distance between each of the navigation sensors 930, 932 and 934 can be represented by a baseline distance vector. For example, a first baseline vector can represent the distance between the navigation sensor 930 and the navigation sensor 932, a second baseline vector can represent the distance between the navigation sensor 930 and the navigation sensor 934, and a third baseline vector can represent the distance between the navigation sensor 932 and the navigation sensor 934.

Figure 10:
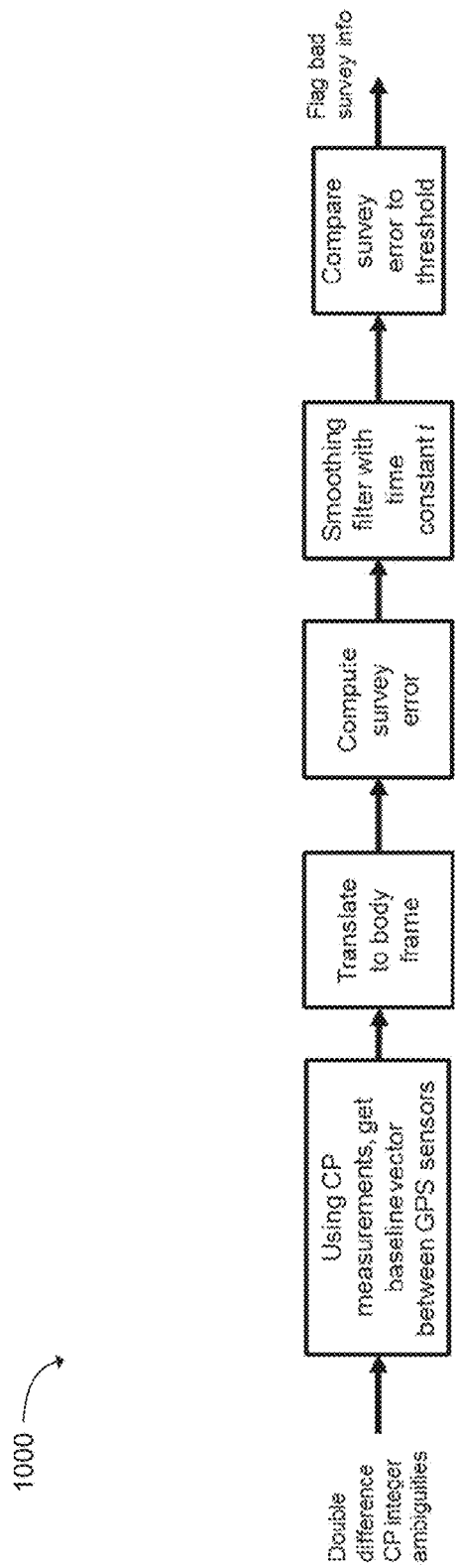
FIG. 10 is a flowchart illustrating a technique for monitoring an accuracy of an existing survey between installed navigation sensors on a moving platform in accordance with an example.

FIG. 10 is a flowchart 1000 illustrating an exemplary technique for monitoring an accuracy of an existing survey between installed navigation sensors (e.g., GPS sensors) on a landing platform. The accuracy of the existing survey can be monitored using a real time sensor installation monitor (RSIM) algorithm. RSIM can determine a refined baseline vector between two GPS sensor locations on the landing platform from a rough baseline vector. RSIM can determine the refined baseline vector to within 1 cm when coupled with high accuracy double difference measurements and high accuracy attitude measurements. These high accuracy double difference measurements and high accuracy attitude measurements can be provided by a high accuracy and integrity attitude source, such as a Real Time Attitude Determination (RTAD) system. When an accurate attitude is not available, RSIM (e.g., a survey monitor) can switch to monitoring the baseline distance between pairs of GPS sensors. In other words, if the baseline distance varies by a predefined amount within a predefined period of time, an alert can be generated.

As an example, the attitude source (e.g., the RTAD algorithm) can provide ultra-accurate attitude measurements, which can resolve double difference carrier phase integer ambiguities in the rough baseline vector between the two GPS sensors. In other words, having carrier phase measurements with integer ambiguities can allow RSIM to compute a highly accurate baseline vector (or refined baseline vector) between a pair of GPS sensors every GPS epoch. Using the refined baseline vector rotated to a body-fixed frame, RSIM can compare the refined baseline vector to the surveyed baseline vector. Over a period of time in which an appropriate number of data samples can be collected, RSIM can determine the level of accuracy in the existing survey and can generate alerts or take corrective actions when survey results are out of tolerance. In other words, the comparison of the refined baseline vector with the surveyed baseline vector can produce a survey error. The survey error can pass through a smoothing filter with a time constant t, wherein t is a defined period of time. The survey error can be compared with a threshold, and if the survey error does not comply with the threshold, then the existing survey can be flagged as being an inaccurate survey. In addition, the refined baseline vector can be indicated as being a more accurate representation of the distance between the two GPS sensors.

To compute the refined baseline vector between two navigation sensors, divergence-free carrier smoothed double difference measurements are used. From the double difference baselines, y, the carrier phase double difference, $\varphi_{L1}$, is used to determine the baseline vectors between receivers, as illustrated in:

$$\underbrace{\begin{pmatrix} \varphi_{L1} \\ \rho_{NL} \end{pmatrix}}_{y} = \underbrace{\begin{pmatrix} G & A \\ G & 0 \end{pmatrix}}_{H} \underbrace{\begin{pmatrix} \delta x \\ N_{L1} \end{pmatrix}}_{X} + \varepsilon.$$

In the equation above, G is the line of sight geometry matrix, $\delta x$ is the baseline vector, $N_{L1}$ is the vector of L1 ambiguities, A is equal to $\lambda_{L1} I$, and $\varepsilon$ is the measurement error. The carrier phase ambiguities are used to adjust the phase measurements in order to determine the refined baseline vector. Additionally, an ultra-accurate source of attitude is used to rotate the refined baseline vectors to the body frame if the precision navigation system is on a moving platform, such as an airplane. In one example, the ultra-accurate source of attitude can be the RTAD algorithm, which can provide both the L1 carrier phase integer ambiguities and an accurate attitude measurement. Coupled with the integer ambiguities, the baseline ambiguity adjusted carrier phase measurements can be calculated, as shown in: $\varphi'_{L1} = \varphi'_{L1} - \lambda_{L1} NL1 = G\delta x + \varepsilon$. Since the measurement error, $\varepsilon$, is for the error for phase measurements, the error is on the order of 5 mm. Solving for the refine baseline vector can provide survey measurements with less than 1 cm of error. The refined baseline vector can be solved by: $\delta x = (G^T WG)^{-1} G^T W\varphi'_{L1}$, where W is the weighting matrix (which is the inverse of the error covariance matrix for the carrier phase measurements).

In one configuration, a Survey Monitor can collect data and average the survey error over time. In addition, the Survey Monitor can flag the survey information when the averaged survey error estimate crosses a given threshold. The Survey Monitor can include approximately six steps: step 1 can include inputting or receiving double difference carrier phase measurement data, resolved integer ambiguities, and an existing survey vector; step 2 can include computing baseline vectors or baseline correction vectors using $\delta x = (G^T WG)^{-1} G^T W\varphi'$; step 3 can include inputting or receiving a high integrity attitude to rotate the baseline vectors to the body frame; step 4 can include comparing the baseline correction vector to an existing survey vector; step 5 can include averaging the estimated survey errors between the baseline correction vector and the existing survey vector; and step 6 can include comparing the errors to a desired threshold and flagging certain surveys accordingly.

With respect to step 1, there are several inputs for the survey monitor algorithm: the existing survey vectors for the sensors in the system, double difference carrier phase data, and the resolved integer ambiguities. The survey vectors comprise relative vectors between each GPS sensor. The vectors are traditionally found through a manual survey of the sensor location through the use of distance measurement equipment. There are many adequate techniques with a multitude of equipment for determining the existing survey vectors. Additionally, data analysis techniques can be used to determine the existing survey vector. Since the GPS sensors are used for positioning, the sensor data can be used to extrapolate the vector between GPS sensors, i.e., the survey vectors. The Survey Monitor can ensure that the existing survey vectors are within tolerance, and thus, existing survey vectors are a beneficial input to the algorithm and are used as a baseline for the Survey Monitor.

The double difference carrier phase measurement data is another element of the baseline vector calculation. The baseline vector is used to describe the computed distance vector between GPS sensors using the Survey Monitor algorithm. The baseline vector is the quantity used to compare to the existing survey vector in order to quantify the error of the existing survey vector and determine if the survey is out of tolerance. Combined with the integer ambiguities, the carrier phase data can allow for sub-centimeter level accuracy when computing the baseline vector. The raw carrier phase and pseudorange measurements from the GPS receiver are differenced between satellites and receivers to give the double difference carrier phase measurements. Double difference carrier phase measurements are part of high accuracy relative positioning.

The fixed carrier phase ambiguities can be combined with the carrier phase measurements to calculate the integer ambiguity resolved double difference carrier phase data, $\varphi_{L1}'$, which is represented as: $\varphi_{L1}' = \varphi_{L1} - \lambda_{L1} N_{L1} = G\delta x + \varepsilon$. The integer ambiguity resolved double difference carrier phase data can be used to compute the baseline vector in step 2 of the Survey Monitor algorithm.

In step 2, the baseline vector can be computed using the carrier phase and the integer ambiguities. The baseline vector can be determined by relating the carrier phase measurements to the geometry between the GPS sensors and the GPS satellites. The matrix (G) relates the GPS receiver to the satellite and is composed of the Line-of-sight vectors between sensor and satellite. The G matrix can be initially computed, or alternatively, the G matrix can be an input into the algorithm. The G matrix is computed using the following: $G_{2i}{}^j = -(\overrightarrow{LOS_{ECEF}}^1 - \overrightarrow{LOS_{ECEF}}^j)$, where $\underline{LOS_{ECEF}}^j$ is the line-of-sight unit vector from GPS receiver 1 to the $j^{th}$ satellite. With the inputs and the G matrix, the baseline vector can be computed. Using the integer ambiguity resolved double difference carrier phase and the G matrix, the baseline vector is computed using a least squares technique. The weighted least squares technique can be used to solve for the baseline vector from $\delta x = (G^T WG)^{-1} G^T W\varphi_{L1}'$. Typically, the baseline vector is computed in an inertial frame. As described in further detail below, the next step of the Survey Monitor algorithm can involve translating the baseline vector to a body frame, or a local reference frame.

With respect to step 3, the survey of sensor can be done in a local coordinate frame. The computed baseline vector is in the inertial frame common between satellites and the GPS sensors. To monitor the existing survey vector, the baseline vector is rotated to the local coordinate frame. A high accuracy and integrity attitude is needed to calculate the rotation matrix. The accuracy of the attitude measurement is dependent on the magnitude of the surveyed vectors. For example, an angular error of θ will translate into a vector error of y for a vector of magnitude y: y=x sin θ. For an error of less than 1 centimeter and a survey vector of 50 meters, the angular error is to be less than 0.011 degrees.

As an example of rotations to local coordinate frame, a standard inertial frame for computing the baseline vectors is in the Earth-Centered, Earth-Fixed (ECEF) coordinate frame, and a standard local coordinate frame is a body frame with positive x forward, positive y to the right, and positive z down. The translation from the ECEF to the local body coordinate frame involves an intermediate rotation to a local tangential plane to the Earth, which is denoted as an East-North-Up coordinate frame. The rotation matrix, $C_{ECEF2LLH}$, using Latitude (λ) and Longitude (φ) measurements as the angles of rotation, is represented as:

$$C_{ECEF2ENU} = \begin{bmatrix} -\sin\lambda & \cos\phi & 0 \\ -\sin\phi\cos\lambda & -\sin\phi\sin\lambda & \cos\phi \\ \cos\phi\cos\lambda & \cos\phi\sin\lambda & \sin\phi \end{bmatrix}.$$

The translation can be made from the ENU frame to the North-East-Down (NED) using the following equation:

$$C_{ENU2NED} = \begin{bmatrix} 0 & 1 & 0 \\ -1 & 0 & 0 \\ 0 & 0 & -1 \end{bmatrix},$$

and then to the body-fixed frame using the following:

$$C_{NED2Body} = \begin{bmatrix} 1 & 0 & 0 \\ 0 & \cos(r) & \sin(r) \\ 0 & -\sin(r) & \cos(r) \end{bmatrix} \begin{bmatrix} \cos(p) & 0 & -\sin(p) \\ 0 & 1 & 0 \\ \sin(p) & 0 & \cos(p) \end{bmatrix}$$
$$\begin{bmatrix} \cos(y) & \sin(y) & 0 \\ -\sin(y) & \cos(y) & 0 \\ 0 & 0 & 1 \end{bmatrix},$$

wherein r, p, y are the roll, pitch, and yaw attitude measurements in the body-fixed frame. After rotating the baseline vector into the same frame as the survey vector, the survey vector can be monitored.

With respect to step 4, monitoring the survey vector error can be straightforward once the baseline vector is computed and translated to the body-fixed frame as the survey. The survey error ($\varepsilon_s$) can be calculated as the difference between the baseline vector (b) and the survey vector (s): $\varepsilon_s = \vec{b} - \vec{s}$. In addition, the residuals between the baseline vector and survey vector can be smoothed over time to improve the fidelity of the monitoring.

With respect to step 5, the reliability of the Survey Monitor can be improved by smoothing the residuals between the baseline vector estimation and survey vector. By smoothing the residuals over a set time frame, a representative error for the existing survey can be determined. An example smoothing technique to estimate the error in the existing survey can be a lag filter:

$$\varepsilon_t = \varepsilon_{t-1} + \frac{\Delta t}{\tau}(\varepsilon_s - \varepsilon_{t-1}),$$

wherein $\varepsilon_t$ is the current smoothed error, $\varepsilon_{t-1}$ is the smoothed error from the previous measurement, Δt is the time change from the previous measurement, τ is the tunable time constant, and $\varepsilon_s$ is the survey error measurement. The time constant (τ) can be adjusted to fit a desired sample size. A smaller time constant can allow for improved real time survey monitoring, such as a case when the structure to which the sensors are mounted to experiences dynamics or flexes. An increased time constant can provide a higher integrity solution for a steady state system. The survey errors, which are smoothed over a shorter temporal window by tuning τ, can be compared to the long term survey errors, or the surveyed vector. This comparison can reveal the short term changes between the GPS sensors. In a high dynamic environment, changes in the vector between the GPS sensors can be attributed to the flexing of the physical structure that the sensors are mounted to. This allows the short term survey errors caused by flexure to be monitored and subsequently compensated for. Once the survey error is determined, survey errors that necessitate action or correction can be indicated.

With respect to step 6, for a survey that has significant error (i.e., an error that exceeds a defined threshold), it may be important to notify an external algorithm or maintainer. Survey errors that are significant can be flagged so that proper action can be taken. A threshold ($T_s$) is set to quantify a significant error. If the survey error exceeds the set threshold, $\bar{\varepsilon}_s > T_s$, then the survey is flagged.

Monitoring of Structure Flexure

A physical platform exposed to external forces or a moving platform, is susceptible to large amounts of flexing of the physical structure of the dynamic platform. These platforms can include, but are not limited to, civil structures such as bridges, large buildings, airports or military structures such as aircraft landing structures with high precision navigation systems. The high precision navigation system will be the example used to describe the method for monitoring of structure flexure. For a navigation system, that requires precise sub-centimeter survey of the GPS sensor locations, a large degree of flexure can translate to increased errors in the navigation solution. Flexure of the installation platform can impact the navigation solution when the flexing causes the navigation sensor position to move a greater amount than the survey error accuracy requirement.

A real time sensor installation monitor (RSIM) can precisely monitor the flexure of the physical structure of the moving platform. A refined baseline vector between GPS sensors can be smoothed over a relatively short temporal window ($t_F$). The refined baseline vector can be compared to a previously surveyed vector. In a high dynamic environment, RSIM can rapidly and accurately determine (and with high integrity assurance) changes in the baseline vectors due to structure flexure.

Figure 11:
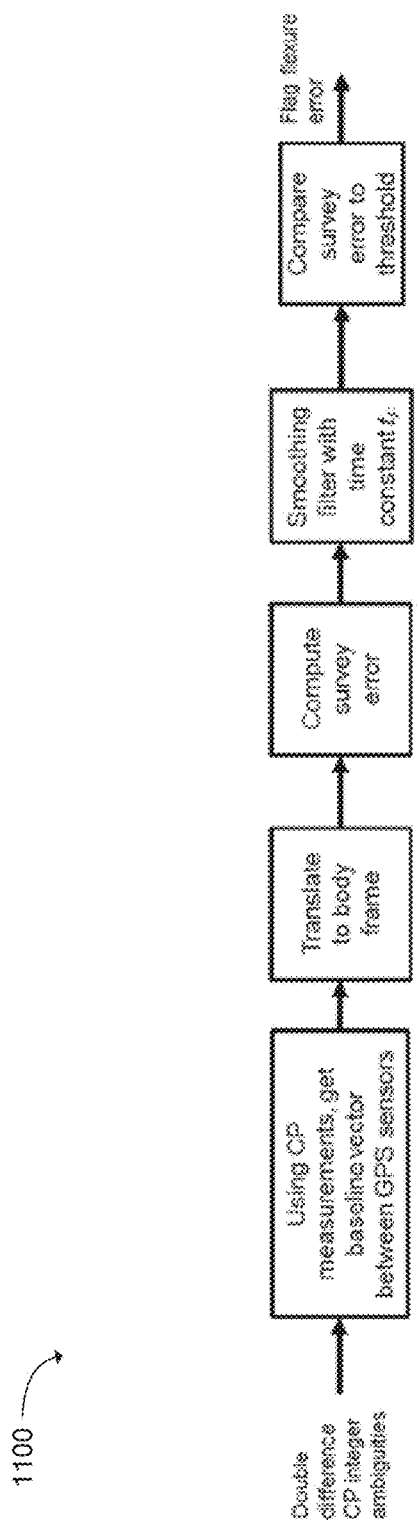
FIG. 11 is a flowchart illustrating a technique for monitoring an amount of flexure of a moving platform in accordance with an example.

FIG. 11 is a flowchart 1100 illustrating an exemplary technique for monitoring an amount of flexure of a moving platform. The amount of flexure of the moving platform can be monitored using a real time sensor installation monitor (RSIM) algorithm. RSIM can determine a refined baseline vector between two GPS sensor locations on the landing platform from a rough baseline vector. RSIM can determine the refined baseline vector to within 1 cm when coupled with high accuracy double difference measurements and high accuracy attitude measurements. These high accuracy double difference measurements and high accuracy attitude measurements can be provided by a attitude source, such as a Real Time Attitude Determination (RTAD) system.

As an example, the attitude source (e.g., the RTAD algorithm) can provide ultra-accurate attitude measurements, and resolve double difference carrier phase integer ambiguities in the rough baseline vector between the two GPS sensors. In other words, having carrier phase measurements with integer ambiguities can allow RSIM to compute a highly accurate baseline vector (or refined baseline vector) between a pair of GPS sensors every GPS epoch. Using the refined baseline vector rotated to a body-fixed frame, RSIM can compare the refined baseline vector to the surveyed baseline vector. Over a period of time in which an appropriate number of data samples can be collected, RSIM can determine the level of accuracy in the existing survey and can generate alerts or take corrective actions when survey results are out of tolerance. In other words, the comparison of the refined baseline vector with the surveyed baseline vector can produce a survey error. The survey error can pass through a smoothing filter with a relatively short time constant $t_F$, wherein $t_F$ is a defined period of time. The survey error can be compared with a threshold, and if the survey error does not comply with the threshold, then the flag can be generated indicating that the amount of flexure of the moving platform exceeds an acceptable value.

In other words, RSIM can be used to monitor the flexure of the installation platform of a precision navigation system. The refined baseline vector between two positions can be calculated accurately over time using RSIM. The refined baseline vector, smoothed over a shorter temporal window ($t_F$), can be compared to the surveyed baseline vector. This comparison can reveal short term changes in baseline vectors between GPS sensors. In a high dynamic environment, changes in the baseline vectors between GPS sensors can be attributed to the flexing of the physical structure that the sensors are mounted to. Thus, RSIM can monitor short term baseline vector errors caused by flexure and then subsequently compensate for these errors. When the accurate attitude truth is not available, RSIM (e.g., a flexure monitor) can switch to monitoring the baseline distance between pairs of GPS sensors. In other words, if the baseline distance varies by a predefined amount within a predefined period of time, an alert indicating possible flexure can be generated.

Figure 12A:
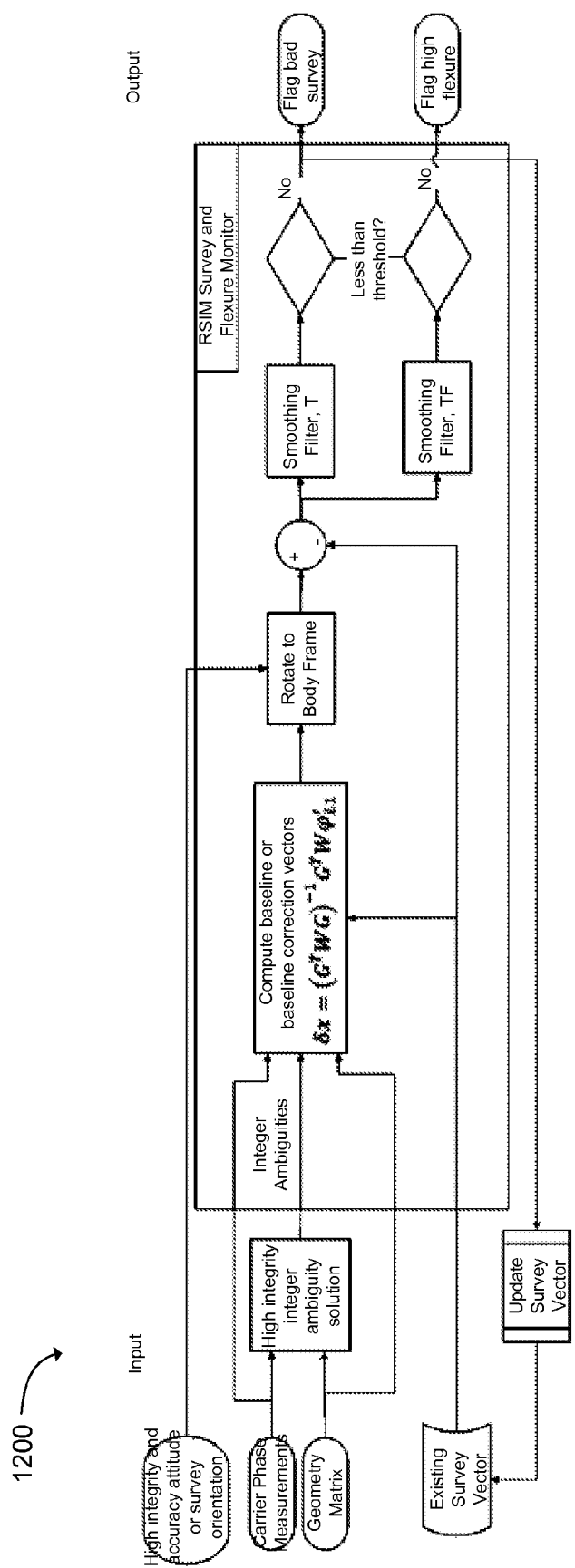
FIG. 12A is a flowchart illustrating a technique for monitoring an amount of flexure of a moving platform and monitoring an accuracy of surveys between installed navigation sensors on the moving platform in accordance with an example.

FIG. 12A is a flowchart 1200 illustrating an exemplary technique for monitoring an amount of flexure of a moving platform and monitoring an accuracy of surveys between installed navigation sensors on the moving platform. A rough baseline vector can be computed between two GPS sensors. The rough baseline vector can be computed using differential GPS techniques. For example, the rough baseline vector can be computed using carrier phase measurements and pseudo range measurements. A high integrity integer ambiguity solution can be provided from an external source, such as RTAD. The carrier phase measurements, the pseudo range measurements, a geometry matrix for differential GPS (DGPS) calculations, and integer ambiguities from RTAD can be used to compute a refined baseline vector between the two GPS sensors. For example, the refined baseline vector can be calculated using $\delta x = (G^T W G)^{-1} G^T W \varphi'_{L1}$. The refined baseline vector can be rotated to a body frame using a high integrity and high accuracy attitude or survey orientation (e.g., provided by RTAD). Using the refined baseline vector rotated to the body-fixed frame, RSIM can compare the refined baseline vector with an existing survey vector (or previously surveyed baseline vector). The comparison of the refined baseline vector with the existing baseline vector can produce a survey error. The survey error can pass through a first smoothing filter with a time constant t, wherein t is a defined period of time. If the survey error is greater than a defined threshold, then an alert can be generated indicating that the survey results are outside a specific tolerance. Additionally or alternatively, the survey error can pass through a second smoothing filter with a time constant $t_F$, wherein $t_F$ is a defined period of time. If the survey error is greater than the defined threshold, then an alert can be generated indicating that an amount of structure flexure on the moving platform is outside a specific tolerance. In one example, $t_F$ can be less than t. In another example, the survey error can be less than the defined threshold, and therefore, the existing survey vector can be updated (e.g., replaced with the refined baseline vector).

Figure 12B:
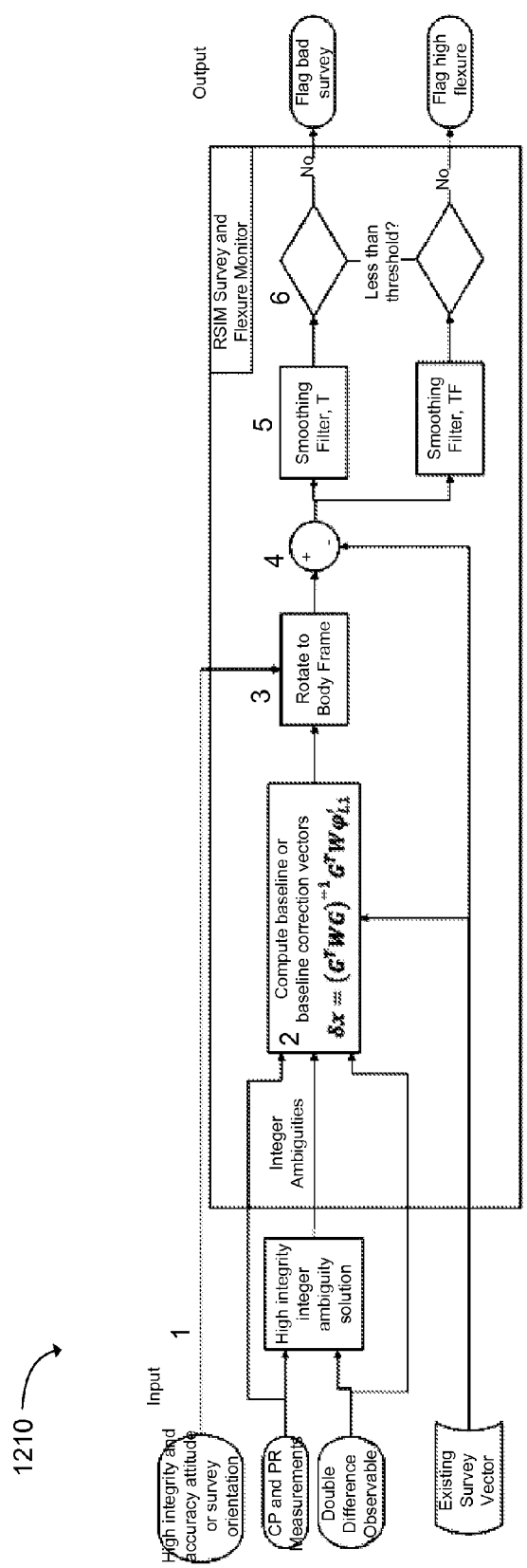
FIG. 12B is an additional flowchart illustrating a technique for monitoring an amount of flexure of a moving platform and monitoring an accuracy of surveys between installed navigation sensors on the moving platform in accordance with an example.

FIG. 12B is an additional flowchart 1210 illustrating an exemplary technique for monitoring an amount of flexure of a moving platform and monitoring an accuracy of surveys between installed navigation sensors on the moving platform. In FIG. 12B, there is no feedback update to an existing survey vector as compared to FIG. 12A.

Figure 13:
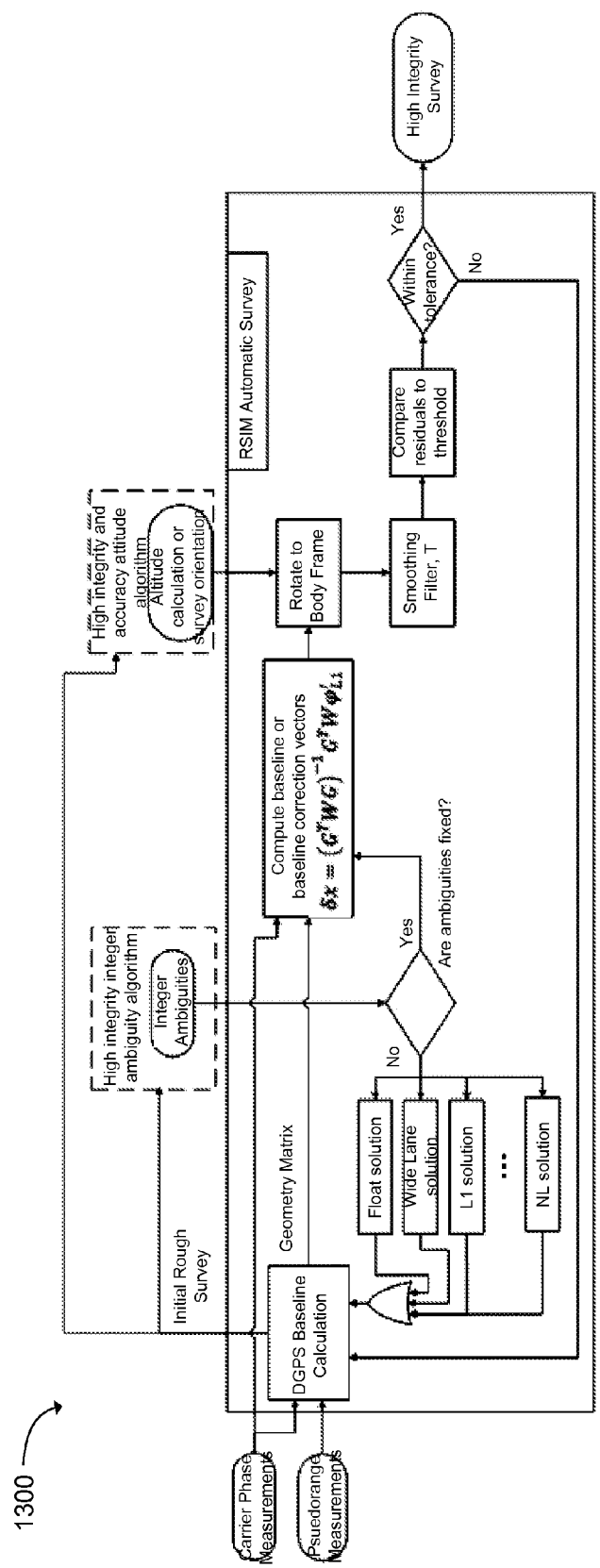
FIG. 13 is a flowchart illustrating a technique for surveying a distance between a pair of navigation sensors in accordance with an example.

FIG. 13 is a flowchart 1300 illustrating an exemplary technique for surveying a distance between a pair of navigation sensors. It can be challenging to converge to an accurate baseline vector when starting without an initial survey. By iterating through increasingly accurate differential GPS (DGPS) baseline calculations, the solution can converge to a desired level of accuracy (e.g., less than 1 cm). A DGPS baseline calculation can be performed using carrier phase measurements and pseudo range measurements. A geometry matrix can be determined based on the DGPS baseline calculation. The DGPS baseline calculation can be augmented with integer ambiguities (e.g., from RTAD). Starting with no initial survey, a wide lane (WL) float solution can obtain a level of accuracy equal to approximately 30 cm. This level of accuracy can be below a desired level, so WL ambiguities can be fixed in the DGPS baseline calculation, which can lead to a level of accuracy equal to approximately 3 cm. This level of accuracy can be below the desired level, so L1 ambiguities can be fixed in the DGPS baseline calculation, which can lead to a level of accuracy equal to approximately 1 cm. Now the ambiguities can be fixed beyond a desired level, so the DGPS calculation and the integer ambiguities can be used to generate a baseline correction vector. The baseline correction vector can be rotated to a body frame using an attitude calculation or survey orientation from a truth source, such as RTAD. Survey error from the baseline correction vector can pass through a smoothing filter for a time period t. Residuals can be compared to the baseline correction vector and if within a defined tolerance level, a high integrity survey is generated. Otherwise, the DGPS baseline calculation can be reset and the process can be repeated.

In one configuration, a flexure monitor algorithm can provide precise monitoring of structure flexure during system operation. The flexure monitoring algorithm can be divided into approximately six steps. Step 1 can include inputting or receiving the double difference carrier phase measurement data, the resolved integer ambiguities, and the existing survey vector. Step 2 can include computing the baseline vectors or baseline correction vectors using $\delta x = (G^T W G)^{-1} G^T W \varphi'$. Step 3 can include inputting or receiving a high integrity attitude to rotate the baseline vectors to the body frame. Step 4 can include comparing the baseline correction vector to an existing survey vector. Step 5 can include averaging the estimated survey errors between the baseline correction vector and the existing survey vector. Step 6 can include comparing the errors to a desired threshold and flagging, or inflating sigmas, for flexure measurements that exceed a defined level.

Figure 14:
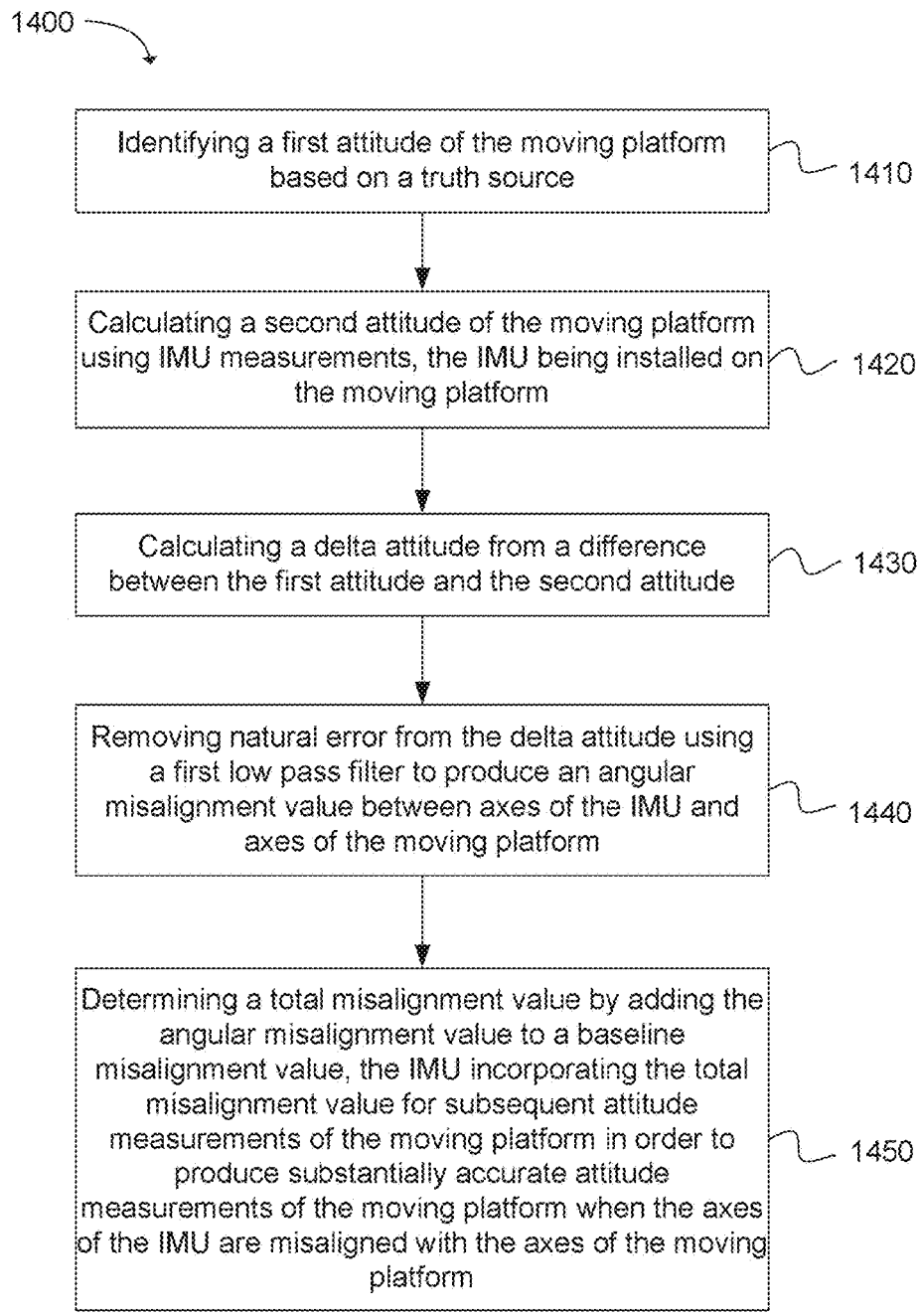
FIG. 14 depicts a flow chart of a method for correcting a misalignment between an inertial measurement unit (IMU) and a moving platform in accordance with an example.

FIG. 14 depicts a flow chart 1400 of a method for correcting a misalignment between an inertial measurement unit (IMU) and a moving platform. The method can be executed as instructions on a machine, where the instructions are included on at least one computer readable medium or one non-transitory machine readable storage medium. The method can be implemented using one or more processors of the machine. The method can include the operation of identifying a first attitude of the moving platform based on a truth source, as in block 1410. The method can include the operation of calculating a second attitude of the moving platform using IMU measurements, the IMU being installed on the moving platform, as in block 1420. The method can include the operation of calculating a delta attitude from a difference between the first attitude and the second attitude, as in block 1430. The method can include the operation of removing natural error from the delta attitude using a first low pass filter to produce an angular misalignment value between axes of the IMU and axes of the moving platform, as in block 1440. The method can include the operation of determining a total misalignment value by adding the angular misalignment value to a baseline misalignment value, the IMU incorporating the total misalignment value for subsequent attitude measurements of the moving platform in order to produce substantially accurate attitude measurements of the moving platform when the axes of the IMU are misaligned with the axes of the moving platform, as in block 1450.

In one example, the method can further include the operations of: providing a mean of the natural error from the delta attitude to a second low pass filter; determining that the mean of the natural error is less than a defined threshold; and using the angular misalignment value to determine the total misalignment value. In addition, the method can include the operations of: determining that the mean of the natural error is greater than a defined threshold; and recalculating the angular misalignment value using an updated first attitude and the second attitude.

In one example, the first low pass filter has a first time constant ($\tau_1$) and the second low pass filter has a second time constant ($\tau_2$), wherein $\tau_2$ is substantially less than $\tau_1$. In another example, the operation of incorporating the total misalignment value at the IMU for the subsequent attitude measurements is effectively similar to physically realigning the axes of the IMU with the axes of the moving platform in order to correct the misalignment. In yet another example, the method can include the operation of monitoring an accuracy level for the subsequent attitude measurements of the moving platform from the IMU for a defined period of time, wherein the accuracy level is monitored by comparing the subsequent attitude measurements with the truth source.

In one configuration, the step of determining the second attitude of the moving platform is performed using global position system (GPS) measurements in combination with the IMU measurements. In another configuration, the moving platform includes a ship or an aircraft. In yet another configuration, the truth source is a real time attitude determination (RTAD) system. In addition, the truth source provides rotational angles of roll, pitch and yaw in real-time of the platform.

Figure 15:
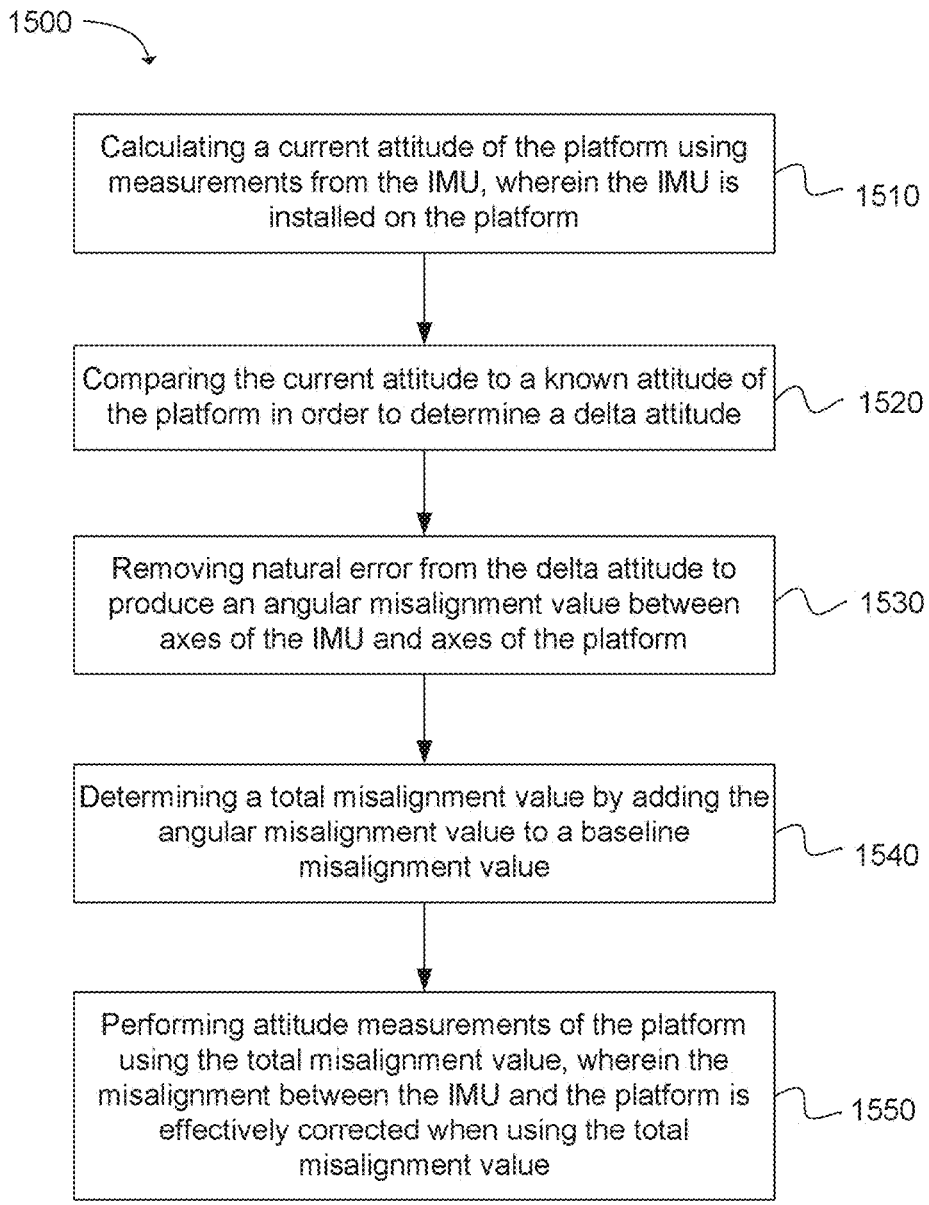
FIG. 15 depicts a flow chart of another method for correcting a misalignment between an inertial measurement unit (IMU) and a platform in accordance with an example.

FIG. 15 depicts a flow chart 1500 of a method for correcting a misalignment between an inertial measurement unit (IMU) and a platform. The method can be executed as instructions on a machine, where the instructions are included on at least one computer readable medium or one non-transitory machine readable storage medium. The method can be implemented using one or more processors of the machine. The method can include the operation of calculating a current attitude of the platform using measurements from the IMU, wherein the IMU is installed on the platform, as in block 1510. The method can include the operation of comparing the current attitude to a known attitude of the platform in order to determine a delta attitude, as in block 1520. The method can include the operation of removing natural error from the delta attitude to produce an angular misalignment value between axes of the IMU and axes of the platform, as in block 1530. The method can include the operation of determining a total misalignment value by adding the angular misalignment value to a baseline misalignment value, as in block 1540. The method can include the operation of performing attitude measurements of the platform using the total alignment value, wherein the misalignment between the IMU and the platform is effectively corrected when using the total alignment value, as in block 1550.

In one example, the known attitude of the platform is determined using a truth source, the truth source including a real time attitude determination (RTAD) system. In another example, the step of calculating the current attitude of the platform is performed using global position system (GPS) measurements in combination with the IMU measurements. In yet another example, the step of removing natural error from the delta attitude is performed using a first low pass filter.

In one example, the method can include the operations of: providing a mean of the natural error from the delta attitude to a second low pass filter; determining that the mean of the natural error is less than a defined threshold; and using the angular misalignment value to determine the total misalignment value. In another example, the method can include the operations of: determining that the mean of the natural error is greater than a defined threshold; and recalculating the angular misalignment value using an updated current attitude and the known attitude.

Figure 16:
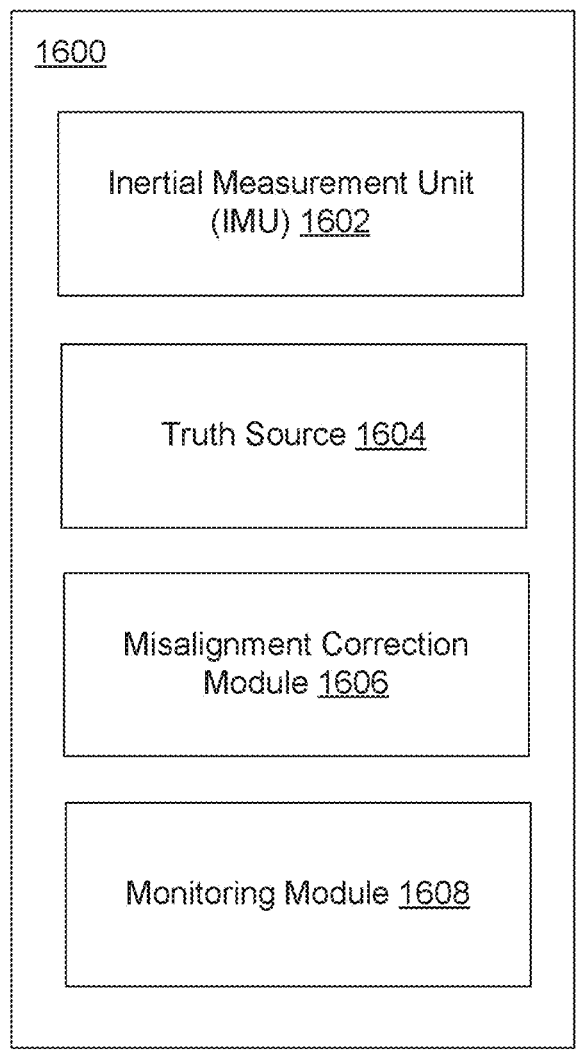
FIG. 16 illustrates a system for correcting a misalignment between an inertial measurement unit (IMU) and a platform in accordance with an example.

FIG. 16 is a system 1600 for correcting a misalignment between an inertial measurement unit (IMU) and a platform. The system 1600 can include an inertial measurement unit (IMU) 1602 installed on the platform. The system 1600 can include a truth source 1604 operable to provide a known attitude of the platform. The system 1600 can include a misalignment correction module 1606 configured to identify the known attitude of the platform using the truth source 1604; calculate a current attitude of the platform using measurements from the IMU 1602; calculate the delta attitude from a difference between the first attitude and the second attitude; determine an angular misalignment value between axes of the IMU 1602 and axes of the moving platform using the delta attitude; identify a natural error from the angular misalignment value; determine that a mean of the natural error is less than a defined threshold; and determine a total misalignment value by adding the angular misalignment value to a baseline misalignment value, the IMU 1602 incorporating the total misalignment value for subsequent attitude measurements of the moving platform in order to produce substantially accurate attitude measurements of the moving platform when the axes of the IMU 1602 are misaligned with the axes of the moving platform.

In one example, the system 1600 can include a monitoring module 1608 configured to monitor an accuracy level of the subsequent attitude measurements of the moving platform from the IMU 1602 for a defined period of time, wherein the accuracy level is monitored by comparing the subsequent attitude measurements with the truth source 1604. In another example, the platform includes a ship or an aircraft. In yet another example, the truth source 1604 is a real time attitude determination (RTAD) system.

Figure 17:
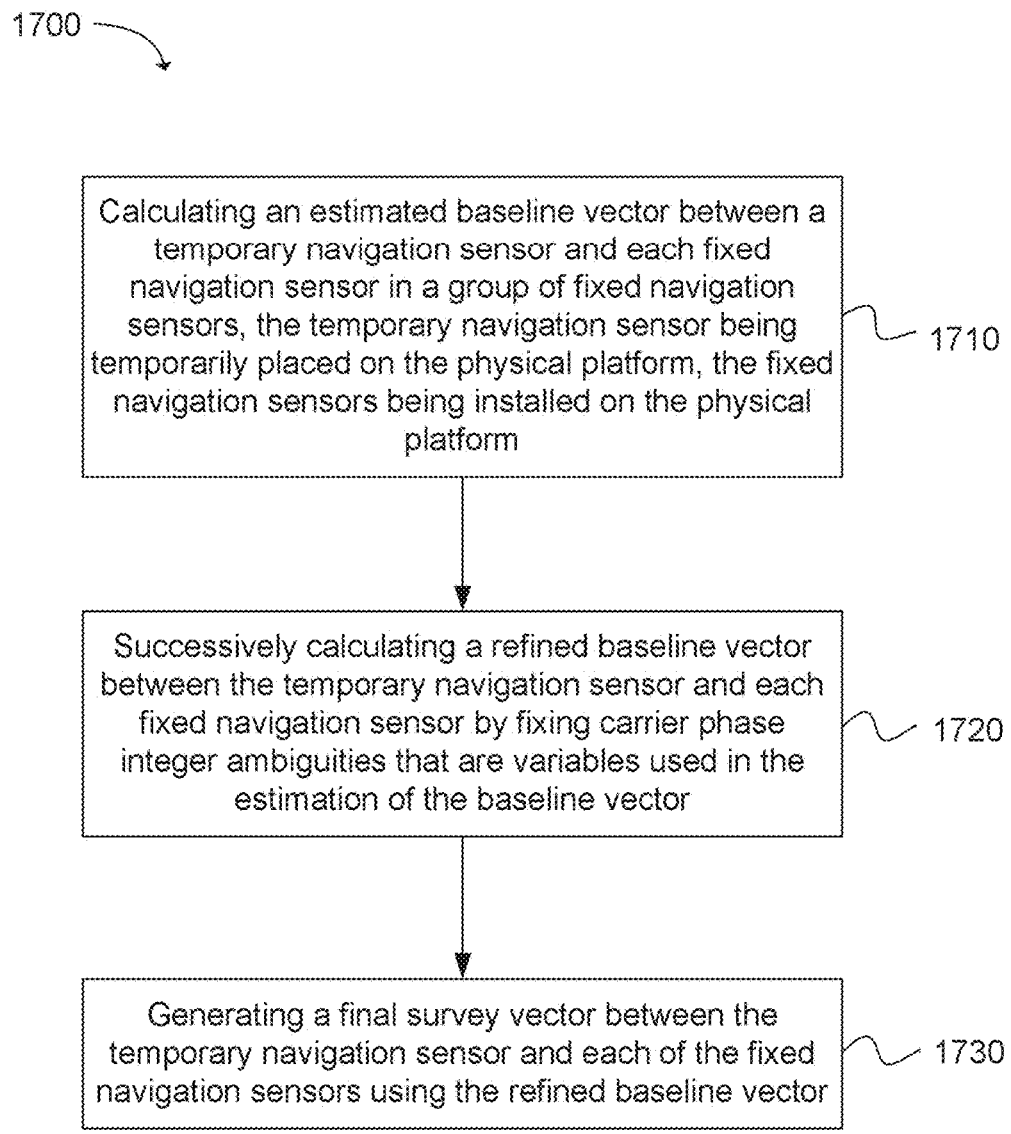
FIG. 17 depicts a flow chart of a method for surveying sensor locations on a physical platform in accordance with an example.

FIG. 17 depicts an exemplary flow chart of a method for surveying sensor locations on a physical platform. The method can be executed as instructions on a machine, where the instructions are included on at least one computer readable medium or one non-transitory machine readable storage medium. The method can be implemented using one or more processors of the machine. The method can include the operation of calculating an estimated baseline vector between a temporary navigation sensor and each fixed navigation sensor in a group of fixed navigation sensors, the temporary navigation sensor being temporarily placed on the physical platform, the fixed navigation sensors being installed on the physical platform, as in block 1710. The method can include the operation of successively calculating a refined baseline vector between the temporary navigation sensor and each fixed navigation sensor by fixing carrier phase integer ambiguities that are variables used in the estimation of the approximate baseline vector, as in block 1720. The method can include the operation of generating a final survey vector between the temporary navigation sensor and each of the fixed navigation sensors using the refined baseline vector, as in block 1730.

In one example, the carrier phase integer ambiguities are successively fixed using an external source. In another example, the carrier phase ambiguities are successively fixed from a longer wavelength to a shortest fixable wavelength in a bootstrap process.

In one example, divergence-free smoothing is continually performed to reduce pseudorange measurement error, thereby enabling successive fixing of the carrier phase integer ambiguities and refining of baseline vectors. In one example, the carrier phase integer ambiguities are successively fixed in a wavelength order of wide-lane, L2, L1, and up to narrow-lane ambiguities.

In one example, the carrier phase ambiguities are successively fixed with high integrity from a longer wavelength to a shortest fixable wavelength in a bootstrap process using the temporary navigation sensor and a subset of fixed navigation sensors. In one example, the estimated baseline vector between the temporary navigation sensor and each fixed navigation sensor in the group of fixed navigation is determined using an initial survey from an external source.

In one example, the method can further comprise the operation of: verifying final survey results on a fixed platform to further ensure high integrity, wherein the verification is performed after final refined baseline vectors and associated carrier phase integer ambiguities are determined, wherein the step of verifying includes: calculating carrier phase measurement residuals for each pair of navigation sensors; collecting and analyzing carrier phase residual statistics over a time period; and performing statistical tests to ensure that the carrier phase measurement residuals comply with an expected distribution given the final survey accuracy.

In one example, the method can further comprise the operation of: verifying final survey results on a mobile platform to further ensure high integrity, wherein the verification is performed after final refined baseline vectors are determined, wherein the step of verifying includes: inputting measurements from a plurality of navigation sensors into a Real Time Attitude Determination System (RTAD) algorithm to resolve the carrier phase integer ambiguities with high integrity and an attitude of the mobile platform; calculating carrier phase measurement residuals for each pair of navigation sensors; collecting and analyzing carrier phase residual statistics over a time period; and performing statistical tests to ensure that the carrier phase measurement residuals comply with an expected distribution given the final survey accuracy. In another example, the method can further include the operation of verifying that estimated survey residuals of the refined baseline vector are below a defined threshold.

In one example, the method can include the operation of translating the refined baseline vector into a local coordinate system using an attitude of the physical platform when the physical platform is mobile, the attitude being calculated using a truth source, the truth source being a real time attitude determination (RTAD) system. In another example, the temporary navigation sensor and the fixed navigation sensors are global positioning systems (GPS) sensors that are included in a navigation aid operate to guide an aircraft to land on the landing platform. In yet another example, the method can include the operation of providing the refined baseline vector to a filter in order to perform error correction.

In one configuration, the method can include the operation of verifying that the carrier phase ambiguities of the refined baseline vector are below a defined threshold. In another configuration, the temporary navigation sensor is temporarily placed at a touchdown point within the physical platform. In yet another configuration, the step of calculating the estimated baseline vector is performed using differential global positioning system (GPS) techniques.

In one example, the step of calculating the estimated baseline vector includes using carrier phase measurements and pseudo range measurements from the temporary navigation sensor and each fixed navigation sensor in the group of fixed navigation sensors. In another example, the method can include the operation of removing the temporary navigation sensor from the physical platform after calculation of the refined baseline vector. In yet another example, the carrier phase integer ambiguities are corrected in the approximate baseline vector using an external high integrity source, wherein the source is a real time attitude determination (RTAD) system. In one configuration, the step of calculating the refined baseline vector ($\delta x$) is performed using $\delta x = (G^T W G)^{-1} G^T W \varphi'$, wherein G is a line of sight geometry matrix, T is the matrix transpose operation, W is a weighting matrix, and $\varphi'$ is an ambiguity-resolved carrier phase measurement. Additionally, $\varphi' = \varphi - \lambda N = G \delta x + \varepsilon$, wherein $\varphi = G \delta x + \lambda N + \varepsilon$, wherein $\varphi$ is an initial carrier phase measurement, $\lambda$ is a wavelength of $\varphi$, N is a carrier phase ambiguity, and $\varepsilon$ is measurement error.

Figure 18:
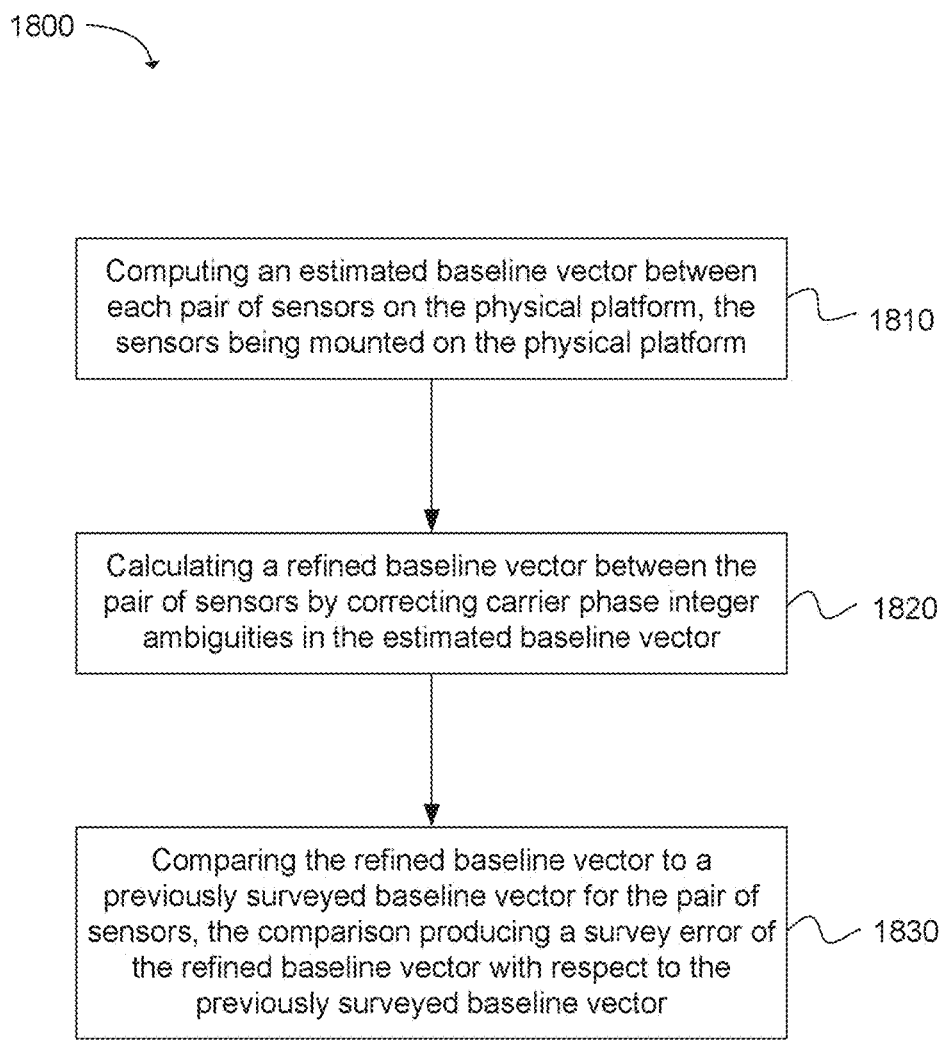
FIG. 18 depicts a flow chart of a method for verifying survey results for sensors on a physical platform in accordance with an example.

FIG. 18 depicts an exemplary flow chart of a method for verifying survey results for sensors on a physical platform. The method can be executed as instructions on a machine, where the instructions are included on at least one computer readable medium or one non-transitory machine readable storage medium. The method can be implemented using one or more processors of the machine. The method can include the operation of computing an estimated baseline vector between each pair of sensors on the physical platform, the sensors being mounted on the physical platform, as in block 1810. The method can include the operation of calculating a refined baseline vector between the pair of sensors by correcting carrier phase integer ambiguities in the estimated baseline vector, the carrier phase ambiguities being corrected using a truth source, as in block 1820. The method can include the operation of comparing the refined baseline vector to a previously surveyed baseline vector for the pair of sensors, the comparison producing a survey error of the refined baseline vector with respect to the previously surveyed baseline vector, as in block 1830.

In one example, the carrier phase integer ambiguities are fixed using a high integrity external source. In another example, the carrier phase integer ambiguities are successively fixed with high integrity from a longer wavelength to a shortest fixable wavelength in a bootstrap process using the temporary navigation sensor and a subset of fixed navigation sensors. In another example, the method can include the operation of generating an alert when the survey error is not within a predefined threshold. In addition, the estimated baseline vector is determined using an existing surveyed baseline vector.

In one example, the refined baseline vector indicates a three dimensional (3D) displacement measurement between the pair of sensors included in the navigation aid. In another example, the sensors included in the navigation aid are global positioning system (GPS) sensors that include GPS antennas. In yet another example, the truth source is a real time attitude determination (RTAD) system.

In one configuration, the method can include the operation of translating the refined baseline vector into a local coordinate system using an attitude of the physical platform, the attitude being calculated using a high accuracy and integrity attitude source. In another configuration, the step of calculating the refined baseline vector ($\delta x$) is performed using $\delta x = (G^T W G)^{-1} G^T W \varphi'$, wherein G is a line of sight geometry matrix, T is the matrix transpose operation, W is a weighting matrix, and $\varphi'$ is an ambiguity-resolved carrier phase measurement. In addition, the method can include the operation of providing the survey error to a smoothing filter for a defined period of time.

Figure 19:
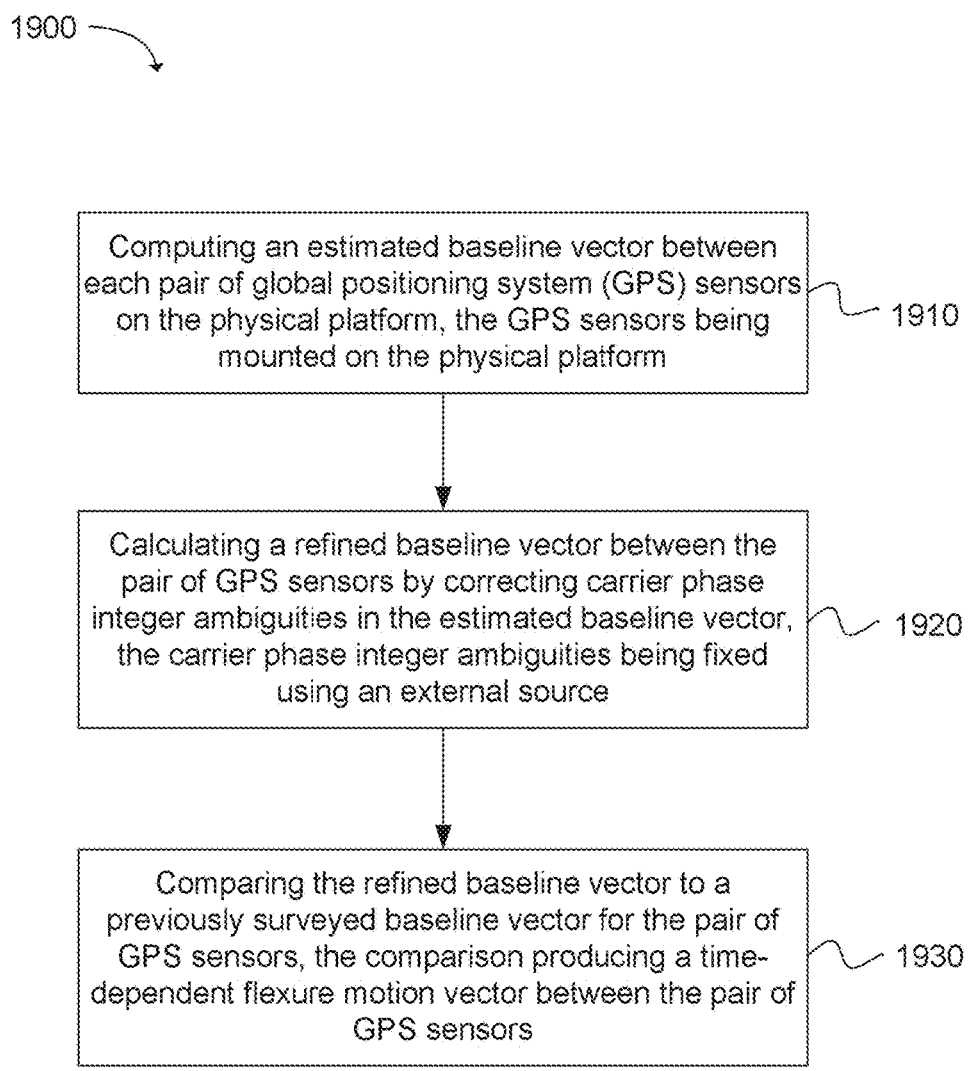
FIG. 19 depicts a flow chart of a method for monitoring flexure of a physical platform in accordance with an example.

FIG. 19 depicts an exemplary flow chart of a method for monitoring flexure of a physical platform. The method can be executed as instructions on a machine, where the instructions are included on at least one computer readable medium or one non-transitory machine readable storage medium. The method can be implemented using one or more processors of the machine. The method can include the operation of computing an estimated baseline vector between each pair of global positioning system (GPS) sensors on the physical platform, the GPS sensors being mounted on the physical platform, as in block 1910. The method can include the operation of calculating a refined baseline vector between the pair of GPS sensors by correcting carrier phase integer ambiguities in the estimated baseline vector, the carrier phase integer ambiguities being fixed using an external source, as in block 1920. The method can include the operation of comparing the refined baseline vector to a previously surveyed baseline vector for the pair of GPS sensors, the comparison producing a time-dependent flexure motion vector between the pair of GPS sensors, as in block 1930.

In one example, the method can further include the operation of generating an alert when the time-dependent flexure motion vector is not within a predefined threshold. In another example, the method can further include the operation of generating an alert when a statistical test indicates that the level of flexure motion is not within a predefined threshold.

In one example, the step of calculating the refined baseline vector ($\delta x$) is performed using $\delta x = (G^T W G)^{-1} G^T W \varphi'$, wherein G is a line of sight geometry matrix, T is the matrix transpose operation, W is a weighting matrix, and $\varphi'$ is an ambiguity-resolved carrier phase measurement. In another example, the method can include the operation of translating the refined baseline vector into a local coordinate system using an attitude of the physical platform, the attitude being calculated using a high integrity and accuracy attitude source. In yet another example, the step of computing the approximate baseline vector includes using carrier phase measurements between the pair of GPS sensors. In addition, the method can include the operation of providing the survey error to a smoothing filter for a defined period of time.

Figure 20:
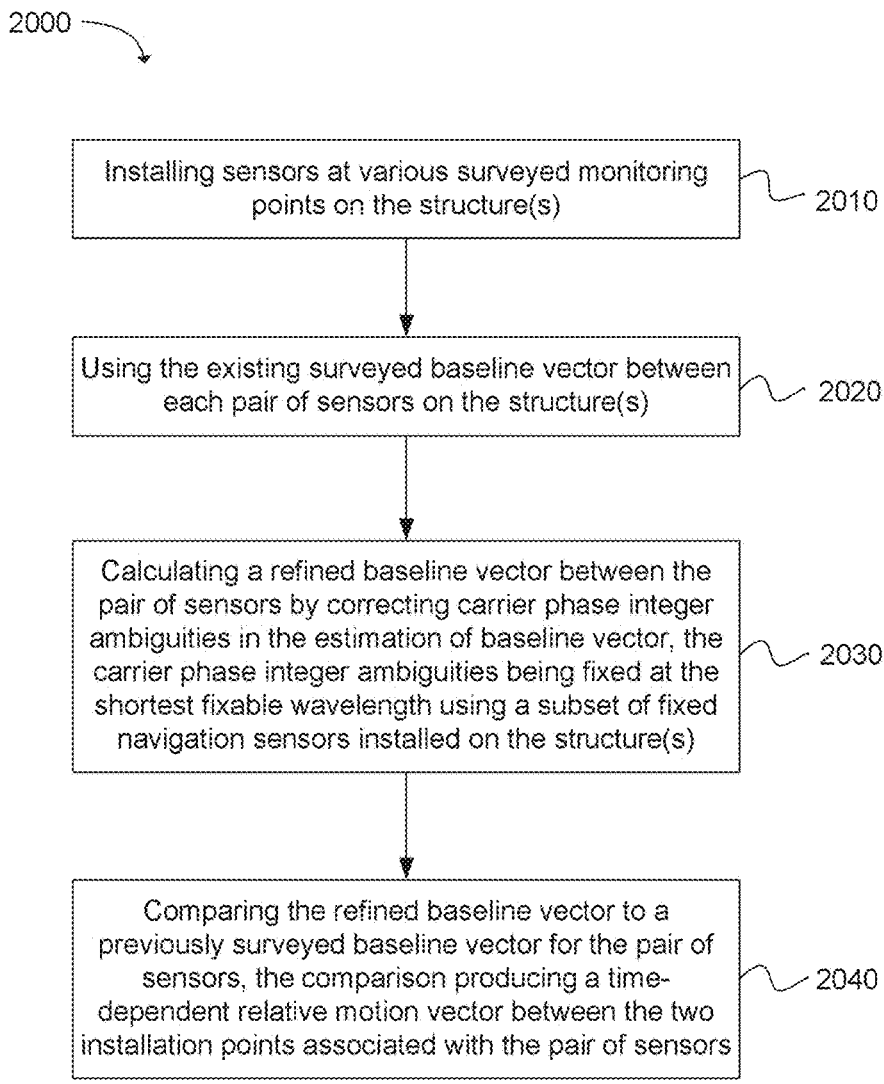
FIG. 20 depicts a flow chart of a method for monitoring small relative movement within an otherwise rigid structure or between otherwise relatively stationary structures in accordance with an example.

FIG. 20 depicts an exemplary flow chart of a method for monitoring small relative movement within an otherwise rigid structure or between otherwise relatively stationary structures. The method can be executed as instructions on a machine, where the instructions are included on at least one computer readable medium or one non-transitory machine readable storage medium. The method can be implemented using one or more processors of the machine. The method can include the operation of installing sensors at various surveyed monitoring points on the structure(s), as in block 2010. The method can include the operation of using the existing surveyed baseline vector between each pair of sensors on the structure(s), as in block 2020. The method can include the operation of calculating a refined baseline vector between the pair of sensors by correcting carrier phase integer ambiguities in the estimation of baseline vector, the carrier phase integer ambiguities being fixed at the shortest fixable wavelength using a subset of fixed navigation sensors installed on the structure(s), as in block 2030. The method can include the operation of comparing the refined baseline vector to a previously surveyed baseline vector for the pair of sensors, the comparison producing a time-dependent relative motion vector between the two installation points associated with the pair of sensors, as in block 2040.

In one example, divergence-free smoothing is continually performed to reduce pseudorange measurement error, thereby enabling carrier phase integer ambiguity fixing at a shortest fixable wavelength. In another example, the carrier phase integer ambiguities are fixed with high integrity using algorithms and a time-dependent relative motion vector is calculated with high integrity.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The satellite may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for surveying sensor locations on a physical platform, the method comprising:
    under control of at least one hardware processor and memory configured with executable instructions:
    receiving signals from a temporary navigation sensor and a group of fixed navigation sensors, the temporary navigation sensor being temporarily placed on the physical platform, the fixed navigation sensors being installed on the physical platform;
    using the signals to calculate an estimated baseline vector between the temporary navigation sensor and each fixed navigation sensor in the group of fixed navigation sensors;
    successively calculating a refined baseline vector between the temporary navigation sensor and each fixed navigation sensor by fixing carrier phase integer ambiguities that are variables used in the estimation of the baseline vector; and
    generating a final survey vector between the temporary navigation sensor and each of the fixed navigation sensors using the refined baseline vector.

2. The method of claim 1, wherein the carrier phase integer ambiguities are successively fixed using an external source.

3. The method of claim 1, wherein the carrier phase integer ambiguities are successively fixed from a longer wavelength to a shortest fixable wavelength in a bootstrap process.

4. The method of claim 1, wherein divergence-free smoothing is continually performed to reduce pseudorange measurement error, thereby enabling successive fixing of the carrier phase integer ambiguities and refining of baseline vectors.

5. The method of claim 1, wherein the carrier phase integer ambiguities are successively fixed in a wavelength order of wide-lane, L2, L1, and up to narrow-lane ambiguities.

6. The method of claim 1, wherein the carrier phase integer ambiguities are successively fixed with high integrity from a longer wavelength to a shortest fixable wavelength in a bootstrap process using the temporary navigation sensor and a subset of fixed navigation sensors.

7. The method of claim 1, wherein the estimated baseline vector between the temporary navigation sensor and each fixed navigation sensor in the group of fixed navigation is determined using an initial survey from an external source.

8. The method of claim 1, further comprising translating the refined baseline vector into a local coordinate system using an attitude of the physical platform when the physical platform is mobile, the attitude being calculated using a high accuracy and integrity source.

9. The method of claim 1, further comprising verifying final survey results on a fixed platform to further ensure high integrity, wherein the verification is performed after final refined baseline vectors and associated carrier phase integer ambiguities are determined, wherein the step of verifying includes:
  calculating carrier phase measurement residuals for each pair of navigation sensors;
  collecting and analyzing carrier phase residual statistics over a time period; and
  performing statistical tests to ensure that the carrier phase measurement residuals comply with an expected distribution given a final survey accuracy.

10. The method of claim 1, further comprising verifying final survey results on a mobile platform to further ensure high integrity, wherein the verification is performed after final refined baseline vectors are determined, wherein the step of verifying includes:
  inputting measurements from a plurality of navigation sensors into a Real Time Attitude Determination System (RTAD) algorithm to resolve the carrier phase integer ambiguities with high integrity and an attitude of the mobile platform;
  calculating carrier phase measurement residuals for each pair of navigation sensors,
  collecting and analyzing carrier phase residual statistics over a time period,
  performing statistical tests to ensure that the carrier phase measurement residuals comply with an expected distribution given a final survey accuracy.

11. The method of claim 1, wherein the temporary navigation sensor and the fixed navigation sensors are global positioning systems (GPS) sensors.

12. The method of claim 1, further comprising providing the refined baseline vector to a filter in order to perform error correction.

13. The method of claim 1, further comprising verifying that estimated survey residuals of the refined baseline vector are below a defined threshold.

14. The method of claim 1, wherein the temporary navigation sensor is temporarily placed at a touchdown point within the physical platform.

15. The method of claim 1, wherein the step of calculating the estimated baseline vector is performed using differential global positioning system (GPS) techniques.

16. The method of claim 1, wherein the step of calculating the estimated baseline vector includes using carrier phase measurements and pseudo range measurements from the temporary navigation sensor and each fixed navigation sensor in the group of fixed navigation sensors.

17. The method of claim 1, further comprising removing the temporary navigation sensor from the physical platform after calculation of the refined baseline vector.

18. The method of claim 1, wherein the carrier phase integer ambiguities are corrected in the estimated baseline vector using an external integer ambiguity resolution source, wherein the integer ambiguity source is a real time attitude determination (RTAD) system.

19. The method of claim 1, wherein the step of calculating the refined baseline vector ($\delta x$) is performed using $\delta x = (G^T W G)^{-1} G^T W \varphi'$, wherein G is a line of sight geometry matrix, T is a matrix transpose operation, W is a weighting matrix, and $\varphi'$ is an ambiguity-resolved carrier phase measurement.

20. The method of claim 19, wherein $\varphi' = \varphi - \lambda N = G \delta x + \varepsilon$, wherein $\varphi = G \delta x + \lambda N + \varepsilon$, wherein $\varphi$ is an initial carrier phase measurement, $\lambda$ is a wavelength of $\varphi$, N is a carrier phase integer ambiguity, and $\varepsilon$ is measurement error.

21. A method for verifying survey results for sensors on a physical platform, the method comprising:
  under control of at least one hardware processor and memory configured with executable instructions:
  receiving signals from the sensors on the physical platform, the sensors being mounted on the physical platform;
  using the signals to compute an estimated baseline vector between each pair of sensors on the physical platform;
  calculating a refined baseline vector between the pair of sensors by correcting carrier phase integer ambiguities in the estimated baseline vector; and
  comparing the refined baseline vector to a previously surveyed baseline vector for the pair of sensors, the comparison producing a survey error of the refined baseline vector with respect to the previously surveyed baseline vector.

22. The method of claim 21, wherein the carrier phase integer ambiguities are fixed using a high integrity external source.

23. The method of claim 21, wherein the carrier phase integer ambiguities are successively fixed with high integrity from a longer wavelength to a shortest fixable wavelength in a bootstrap process using a temporary navigation sensor and a subset of fixed navigation sensors.

24. The method of claim 21, further comprising generating an alert when the survey error is not within a predefined threshold.

25. The method of claim 21, wherein the estimated baseline vector is determined using an existing surveyed baseline vector.

26. The method of claim 21, wherein the refined baseline vector indicates a three dimensional (3D) displacement measurement between the pair of sensors.

27. The method of claim 21, wherein the sensors are global positioning system (GPS) sensors that include GPS antennas.

28. The method of claim 21, further comprising translating the refined baseline vector into a local coordinate system using an attitude of the physical platform, the attitude being calculated using a high accuracy attitude source.

29. The method of claim 21, wherein the step of calculating the refined baseline vector ($\delta x$) is performed using $\delta x = (G^T W G)^{-1} G^T W \varphi'$, wherein G is a line of sight geometry matrix, T is a matrix transpose operation, W is a weighting matrix, and $\varphi'$ is an ambiguity-resolved carrier phase measurement.

30. The method of claim 21, further comprising providing the survey error to a smoothing filter for a defined period of smoothing time.

31. A method for monitoring flexure of a physical platform, the method comprising:
  under control of at least one hardware processor and memory configured with executable instructions:
  receiving signals from global positioning system (GPS) sensors on the physical platform, the GPS sensors being mounted on the physical platform;

using the signals to compute an estimated baseline vector between each pair of the GPS sensors on the physical platform;

calculating a refined baseline vector between each pair of the GPS sensors by correcting carrier phase integer ambiguities in the estimated baseline vector, the carrier phase integer ambiguities being fixed using an external source; and comparing the refined baseline vector to a previously surveyed baseline vector for each pair of the GPS sensors, the comparison producing a time-dependent flexure motion vector between each pair of the GPS sensors.

32. The method of claim 31, further comprising generating an alert when the time-dependent flexure motion vector is not within a predefined threshold.

33. The method of claim 31, further comprising generating an alert when a statistical test indicates that a level of the time-dependent flexure motion is not within a predefined threshold.

34. The method of claim 31, wherein the step of calculating the refined baseline vector ($\delta x$) is performed using $\delta x = (G^T W G)^{-1} G^T W \varphi'$, wherein G is a line of sight geometry matrix, T is a matrix transpose operation, W is a weighting matrix, and $\varphi'$ is an ambiguity-resolved carrier phase measurement.

35. The method of claim 31, further comprising translating the refined baseline vector into a local coordinate system using an attitude of the physical platform, the attitude being calculated using a high accuracy and integrity attitude source.

36. A method for monitoring small relative movement within an otherwise rigid structure or between otherwise relatively stationary structures, the method comprising:
under control of at least one hardware processor and memory configured with executable instructions:
receiving signals from pairs of sensors installed at various surveyed monitoring points on one or more structures;
computing surveyed baseline vector between the pairs of sensors using the signals received from the pairs of sensors;
using the surveyed baseline vector between the pairs of sensors on the one or more structures;
calculating a refined baseline vector between the pair of sensors by correcting carrier phase integer ambiguities in an estimation of baseline vector, the carrier phase integer ambiguities being fixed at an shortest fixable wavelength using a subset of fixed navigation sensors installed on the one or more structures; and
comparing the refined baseline vector to a previously surveyed baseline vector for the pair of sensors, the comparison producing a time-dependent relative motion vector between the two installation points associated with the pair of sensors.

37. The method of claim 36, wherein divergence-free smoothing is continually performed to reduce pseudorange measurement error, thereby enabling carrier phase integer ambiguity fixing at a shortest fixable wavelength.

38. The method of claim 36, wherein the carrier phase integer ambiguities are fixed with high integrity using algorithms and a time-dependent relative motion vector is calculated with high integrity.

* * * * *